US011295174B2

(12) United States Patent
Hernandez Leal et al.

(10) Patent No.: US 11,295,174 B2
(45) Date of Patent: Apr. 5, 2022

(54) OPPONENT MODELING WITH ASYNCHRONOUS METHODS IN DEEP RL

(71) Applicant: ROYAL BANK OF CANADA, Toronto (CA)

(72) Inventors: Pablo Francisco Hernandez Leal, Edmonton (CA); Bilal Kartal, Edmonton (CA); Matthew Edmund Taylor, Edmonton (CA)

(73) Assignee: ROYAL BANK OF CANADA, Toronto (CA)

( * ) Notice: Subject to any disclaimer, the term of this patent is extended or adjusted under 35 U.S.C. 154(b) by 330 days.

(21) Appl. No.: 16/674,782

(22) Filed: Nov. 5, 2019

(65) Prior Publication Data

US 2020/0143208 A1    May 7, 2020

Related U.S. Application Data

(60) Provisional application No. 62/755,820, filed on Nov. 5, 2018.

(51) Int. Cl.
*G06K 9/62* (2006.01)
*G06N 3/04* (2006.01)
(Continued)

(52) U.S. Cl.
CPC ......... *G06K 9/6264* (2013.01); *G06F 9/3822* (2013.01); *G06F 17/16* (2013.01);
(Continued)

(58) Field of Classification Search
CPC ..... G06K 9/6264; G06F 9/3822; G06F 17/16; G06N 3/0454; G06N 3/08; G06N 5/043
See application file for complete search history.

(56) References Cited

U.S. PATENT DOCUMENTS

| | | | |
|---|---|---|---|
| 8,103,606 B2 * | 1/2012 | Moussa | G06N 3/063 706/31 |
| 2018/0060301 A1 * | 3/2018 | Li | G06N 3/08 |

(Continued)

OTHER PUBLICATIONS

Y. Rao, D. Lin, J. Lu and J. Zhou, "Learning Globally Optimized Object Detector via Policy Gradient," 2018 IEEE/CVF Conference on Computer Vision and Pattern Recognition, 2018, pp. 6190-6198, doi: 10.1109/CVPR.2018.00648. (Year: 2018).*

(Continued)

*Primary Examiner* — Fayyaz Alam
(74) *Attorney, Agent, or Firm* — Norton Rose Fulbright Canada LLP

(57) ABSTRACT

A computer system and method for extending parallelized asynchronous reinforcement learning to include agent modeling for training a neural network is described. Coordinated operation of plurality of hardware processors or threads is utilized such that each functions as a worker process that is configured to simultaneously interact with a target computing environment for local gradient computation based on a loss determination mechanism and to update global network parameters. The loss determination mechanism includes at least a policy loss term (actor), a value loss term (critic), and a supervised cross entropy loss. Variations are described further where the neural network is adapted to include a latent space to track agent policy features.

22 Claims, 29 Drawing Sheets

(51) Int. Cl.
G06N 5/04 (2006.01)
G06F 9/38 (2018.01)
G06F 17/16 (2006.01)
G06N 3/08 (2006.01)

(52) U.S. Cl.
CPC ............. *G06N 3/0454* (2013.01); *G06N 3/08* (2013.01); *G06N 5/043* (2013.01)

(56) References Cited

U.S. PATENT DOCUMENTS

| | | | |
|---|---|---|---|
| 2019/0049957 A1* | 2/2019 | Healey | G05D 1/0221 |
| 2019/0258918 A1* | 8/2019 | Wang | G06N 3/006 |
| 2019/0258938 A1* | 8/2019 | Mnih | G06N 3/0445 |
| 2020/0033869 A1* | 1/2020 | Palanisamy | G06N 3/006 |
| 2021/0192358 A1* | 6/2021 | Song | G06N 3/0445 |

OTHER PUBLICATIONS

Albrecht, S. et al., "A Game-Theoretic Model and Best-Response Learning Method for Ad Hoc Coordination in Multiagent Systems", Proceedings of the 12th International Conference on Autonomous Agents and Multi-Agent Systems, 2013, pp. 1155-1156.
Albrecht, S. et al., "Autonomous Agents Modelling Other Agents: A Comprehensive Survey and Open Problems", Artificial Intelligence, 2018, 258, pp. 66-95.
Arukumaran, K. et al., "A Brief Survey of Deep Reinforcement Learning", arXiv Preprint, 2017, arXiv:1708.05866v2.
Banerjee, B. et al., "Efficient Learning of Multistep Best Response", Proceedings of the 4th International Conference on Autonomous Agents and Multiagent Systems, 2005, pp. 60-66.
Bansal, T. et al., "Emergent Complexity via Multi-Agent Competition", In International Conference on Machine Learning, 2018.
Bard, N., et al., "Online implicit agent modelling", In Proceedings of the 12th International Conference on Autonomous Agents and Multiagent Systems, 2013, 255-262.
Barrett, S. et al., "Teamwork with Limited Knowledge of Teammates", In Proceedings of the Twenty-Seventh AAAI Conference on Artificial Intelligence, 2013, 102-108.
Bengio, Y. et al., "Curriculum learning", In Proceedings of the 26th annual international conference on machine learning, 2009, 41-48. ACM.
Bowling, M. et al., "Multiagent learning using a variable learning rate", Artificial Intelligence, 2002, 136(2):215-250.
Watkins, J., "Learning from delayed rewards", Ph.D. Dissertation, King's College, Cambridge, UK, 1989.
Busoniu, L .et al., "A Comprehensive Survey of Multiagent Reinforcement Learning", IEEE Transactions on Systems, Man and Cybernetics, Part C (Applications and Reviews), 2008, 38(2): 156-172.
Camerer, C. F. et al., "Behavioural Game Theory: Thinking, Learning and Teaching", In Advances in Understanding Strategic Behavior, 2004,120-180.
Carmel, D., et al., "Opponent Modeling in Multi-Agent Systems", In IJCAI '95: Proceedings of the Workshop on Adaption and Learning in Multi-Agent Systems, 1995, Springer-Verlag.
Chalkiadakis, G., et al., "Coordination in Multiagent Reinforcement Learning: A Bayesian Approach", In Proceedings of the International Conference on Autonomous Agents, 2003, 709-716.
Clevert, D.-A. et al., "Fast and accurate deep network learning by exponential linear units (ELUs)", 2015, arXiv preprint arXiv:1511. 07289.
Foerster, J. N.et al., "Learning to communicate with deep multi-agent reinforcement learning", In Advances in Neural Information Processing Systems, 2016, 2145-2153.
Foerster, J. N.et al., "Stabilising Experience Replay for Deep Multi-Agent Reinforcement Learning", In International Conference on Machine Learning, 2017.
Foerster, J. N. et al., "Learning with Opponent-Learning Awareness", In Proceedings of 17th International Conference on Autonomous Agents and Multiagent Systems, 2018.
Gruslys, A. et al., "The reactor: A sample-efficient actor-critic architecture", arXiv preprint, 2017, arXiv:1704.04651.
He, H. et al., "Opponent modeling in deep reinforcement learning", In 33rd International Conference on Machine Learning, 2016, 2675-2684.
Heinrich, J., et al., "Deep Reinforcement Learning from Self-Play in Imperfect-Information Games", arXiv preprint, 2016, arXiv:1603. 01121.
Henderson, P.; et al., "Deep Reinforcement Learning That Matters", In 32nd AAAI Conference on Artificial Intelligence, 2018.
Hernandez-Leal, P. et al., "Is multiagent deep reinforcement learning the answer or the question? A brief survey", arXiv preprint, 2018, arXiv:1810.05587.
Hong, Z.-W. et al., "A Deep Policy Inference Q-Network for Multi-Agent Systems", In International Conference on Autonomous Agents and Multiagent Systems, 2018.
Jaderberg, M. et al., "Population based training of neural networks", arXiv preprint, 2017, arXiv:1711.09846.
Jaderberg, M. et al., "Reinforcement Learning with Unsupervised Auxiliary Tasks", In International Conference on Learning Representations, 2017.
Jaderberg, M. et al., "Human-level performance in firstperson multiplayer games with population-based deep reinforcement learning" arXiv preprint, 2018, arXiv:1807.01281.
Lample, G. et al., "Playing fps games with deep reinforcement learning", In AAAI, 2017, 2140-2146.
Lanctot, M. et al., "A Unified Game-Theoretic Approach to Multiagent Reinforcement Learning", In Advances in Neural Infomnation Processing Systems, 2017.
Littman, M. L. "Markov games as a framework for multi-agent reinforcement learning", In Proceedings of the 11th International Conference on Machine Learning, 1994, 157-163.
Mnih, V. et al., "Playing Atari with Deep Reinforcement Learning", arXiv preprint, 2013, arXiv:1312.5602v1.
Mnih, V. et al., "Human-level control through deep reinforcement learning", Nature, 2015, 518(7540):529-533.
Mnih, V. et al., "Asynchronous methods foMnih, V. et al., "Asynchronous methods for deep reinforcement learning", In International conference on machine learning, 2016, 1928-1937.r deep reinforcement learning", In International conference on machine learning, 2016, 1928-1937.
Morav c' k, M. et al., "Deep-Stack: Expert-level artificial intelligence in heads-up no-limit poker", Science 356, 2017, (6337):508-513.
Nagarajan, P. et al., "Deterministic implementations for reproducibility in deep reinforcement learning", arXiv preprint, 2018. arXiv:1809. 05676.
Rabinowitz, N. C. et al., "Machine Theory of Mind", In International Conference on Machine Learning, 2018.
Raileanu, R. et al., "Modeling Others using Oneself in Multi-Agent Reinforcement Learning", In International Conference on Machine Learning, 2018.
Resnick, C. et al., "Pommerman: A multi-agent playground", arXiv preprint, 2018, arXiv:1809.07124.
Schulman, J. et al., "Proximal Policy Optimization Algorithms", arXiv preprint, 2017, arXiv:1707.06347.
Silver, D. et al., "Mastering the game of Go with deep neural networks and tree search", Nature, 2016, 529(7587):484-489.
Walsh, W. E. et al., "Analyzing complex strategic interactions in multi-agent systems", AAAI-02 Workshop on Game-Theoretic and Decision-Theoretic Agents, 2002, 109-118.
Tampuu, A. et al., "Multiagent Cooperation and Competition with Deep Reinforcement Learning", International Conference on Learning Representations, 2015.
Torrado, R. R. et al., "Deep Reinforcement Learning for General Video Game AI", arXiv preprint, 2018, arXiv:1806.02448.
Tuyls, K., et al., "Multiagent learning: Basics, challenges, and prospects", AI Magazine, 2012, 33(3):41-52.

* cited by examiner

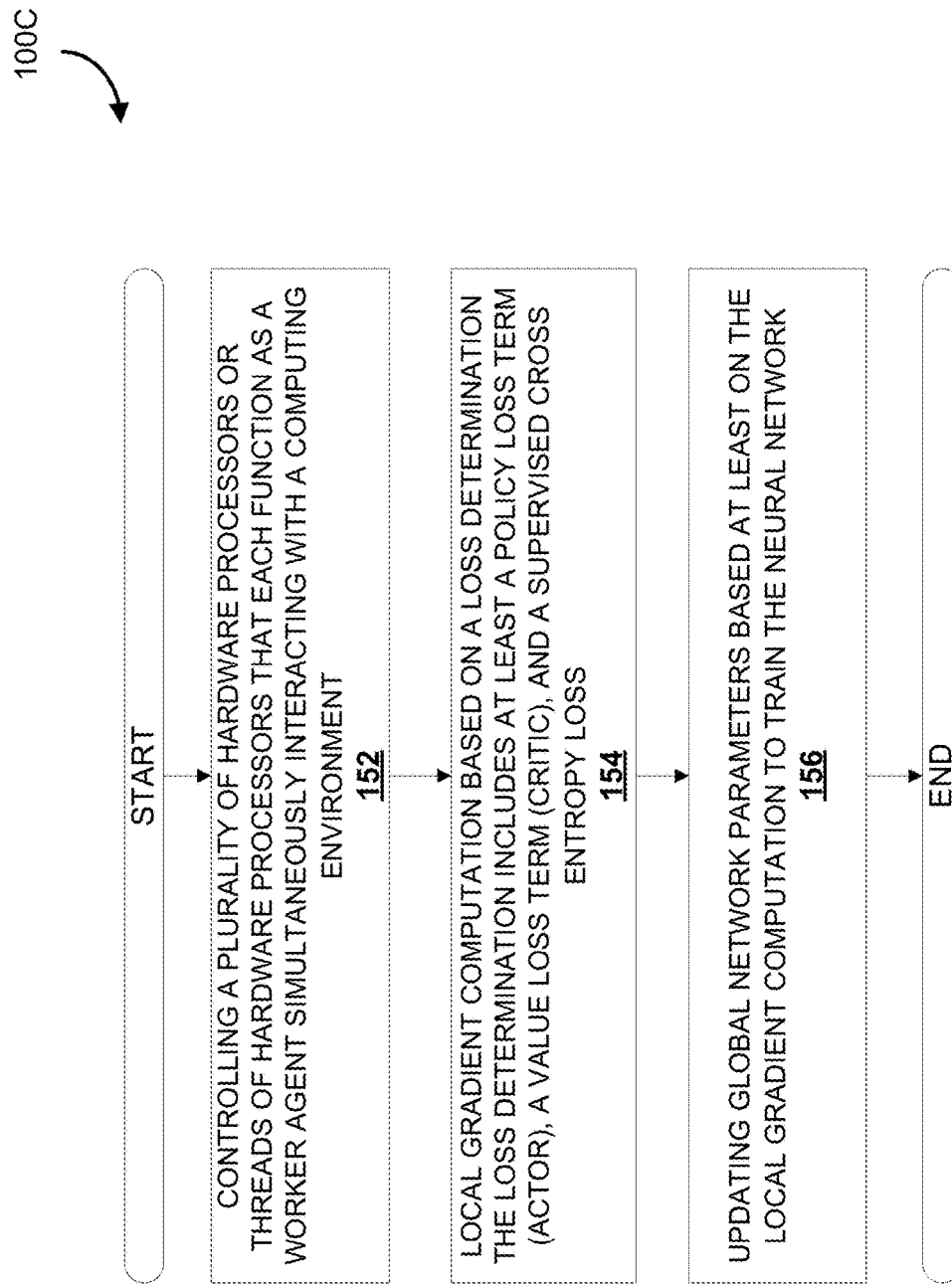

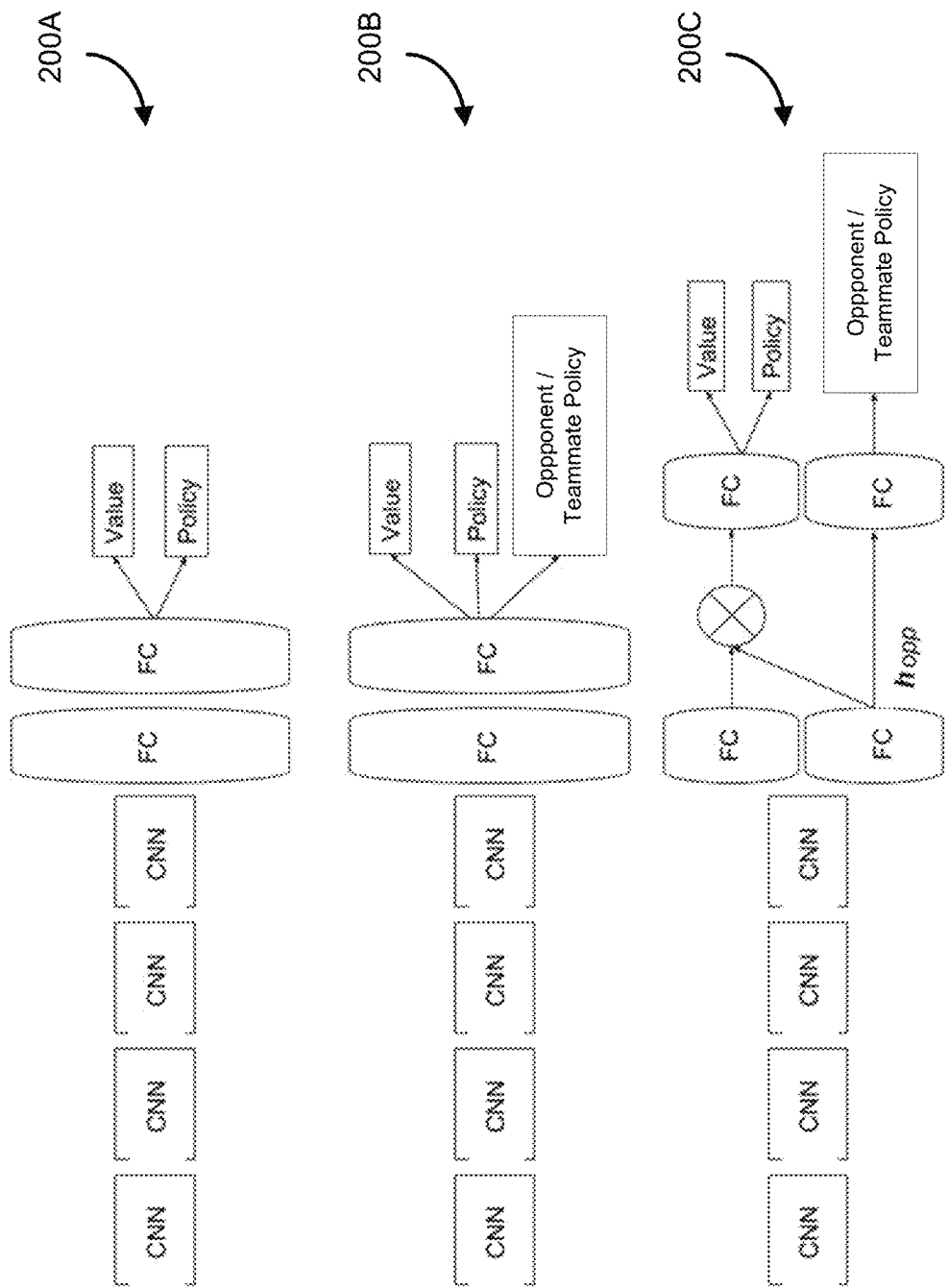

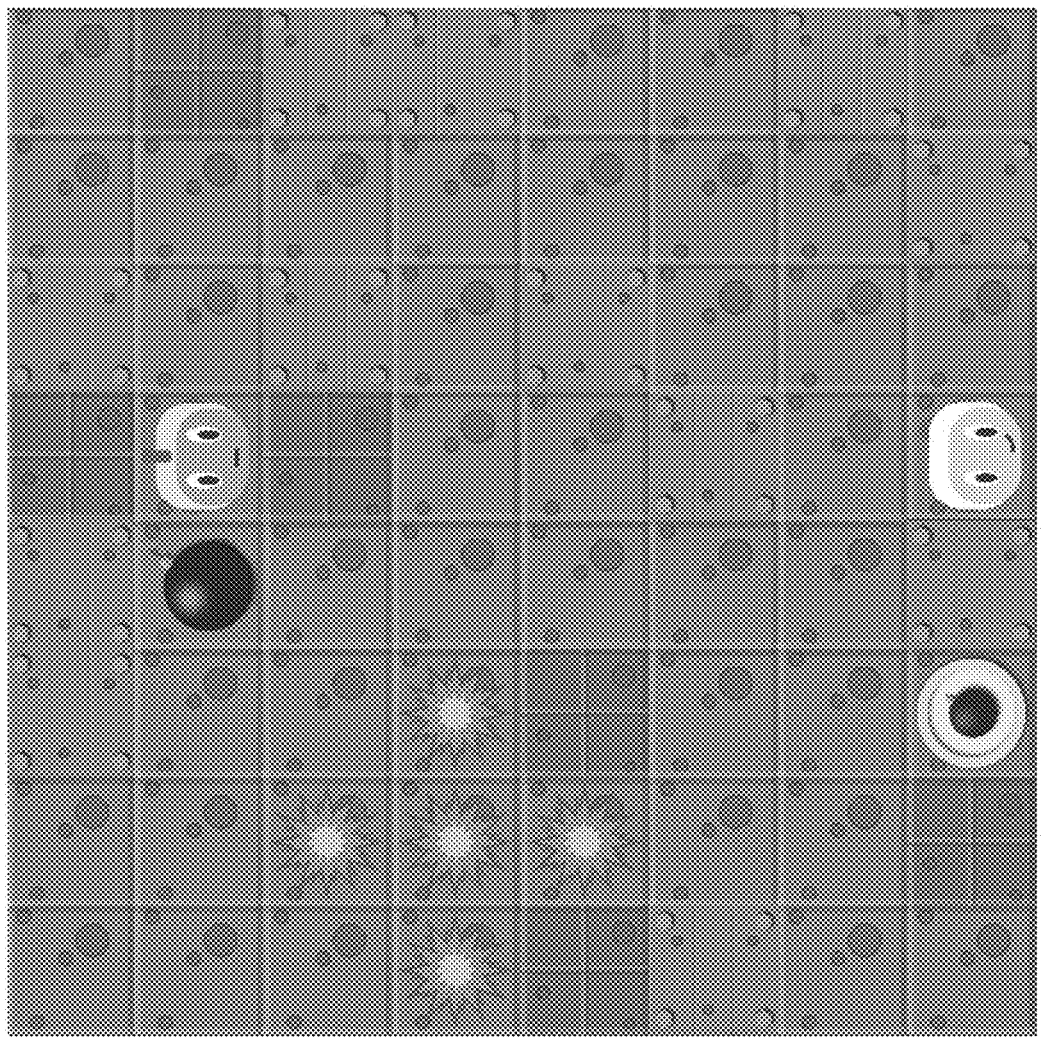

OPPONENT MODELING WITH ASYNCHRONOUS METHODS IN DEEP RL

CROSS-REFERENCE

This application is a non-provisional of, and claims all benefit, including priority to, "OPPONENT MODELING WITH ASYNCHRONOUS METHODS IN DEEP RL", U.S. Application No. 62/755,820, filed 5 Nov. 2018, incorporated herein by reference in its entirety.

FIELD

Embodiments of the present disclosure generally relate to the field of machine learning and more specifically, embodiments relate to devices, systems and methods for agents (such as opponents and teammates) modeling with asynchronous methods in deep reinforcement learning (RL).

INTRODUCTION

An important ability for agents to have is to be able to reason about the behaviors of other agents by constructing models that make predictions about the modeled agents.

This agent modeling takes concepts and algorithms from multiagent systems (since the environment includes at least by two agents), game theory (which studies the strategic interactions among agents), and reinforcement learning (since the model may be based on information observed from interactions).

Agent modeling can serve two purposes in multiagent settings: it improves the coordination efficiency in cooperative scenarios and, in competitive scenarios, it helps the agent to better optimize (best respond) its actions against the predicted agent policy.

Early algorithms for agent modeling came from game theory literature, e.g., fictitious play. Later, many works adapted reinforcement learning algorithms for this task. Recently, agent modeling has been also considered in the context of deep reinforcement learning (DRL). DRL has shown outstanding results in Atari games, Poker and Go.

SUMMARY

Approaches relating to deep reinforcement learning (DRL) for multiagent systems are proposed, along with corresponding systems, methods, devices, apparatuses, and computer program products (e.g., affixed on computer-interpretable instructions on non-transitory computer readable media). Asynchronous methods for deep reinforcement learning provide good performance and ability to be distributed across threads or CPUs.

The approaches described herein are adapted to model agent policies for training computer-based machine learning model architectures (e.g., neural networks) such that improved results (e.g., more accurate outputs or reward maximization) can be obtained in a shorter learning period (e.g., timesteps, iterations), in accordance with some embodiments. While the approaches described herein may refer to opponents, Applicant notes that the term opponent in the context of this application can also include teammates, where the goal can be a fully or partially cooperative goal. Furthermore, an external agent does not necessarily have to be defined as a teammate or an opponent specifically. For example, in a negotiating game, the external agent may simply be acting out of self interest, which means that the agent may sometimes be a teammate, and sometimes an opponent, depending on the goals defined for the game.

The proposed approach of some embodiments is described as the Asynchronous Advantage Actor-Critic (A3C) mechanism, an approach to opponent modeling that helps accelerate learning as a technical solution. Specific implementation is described using computer systems and physical computer hardware. Two variant architectures are proposed in accordance with various embodiments: the first one based on parameter sharing (denoted as AMS-A3C, parameter sharing is used to model the opponent/teammate policy as an auxiliary task as well as the actor and the critic), and the second one based on opponent policy features (denoted as AMF-A3C, using policy features to learn latent space features that are used as input when computing the actor and the critic of the learning agent). For each approach, refined loss functions are provided. Embodiments of the variant approaches are also compared against one another in simulations.

Example technical implementation is described where neural networks having a plurality of convolutional layers (e.g., 3-4 layers, with 32 filters, 3×3 kernels) and fully connected layers (e.g., with 128 hidden units) and a plurality of heads (e.g., 2 heads) are used. The implementation environment can include computer processor units (e.g., 12 CPUs), and corresponding processor cores. In implementation, parameters such as entropy weights, value loss weights, policy loss weights, etc., may be tuned and/or optimized.

Both architectures are machine learning approaches that are configured to adapt learn the opponent's policy besides the standard actor (policy) and critic (values). Experiments were performed in a two-player version of the Pommerman™ game and a cooperative game showing that the proposed architectures outperformed a comparative A3C architecture when learning a best response defined in terms of training time and average rewards.

The approaches herein can be used, for example, as a physical computer server configured to receive, on a message bus, input data sets representing episodic environmental updates including opponent/teammate agent actions. The environments, in the context of a practical implementation, can include stock market trade execution data, video game playing data, robotic environment control data (e.g., autonomous car navigation for driver order dispatching, robot navigation), traffic routing, data packet for internet congestion control routing, and recommender systems, seat inventory control and/or overbooking, among others. The computer server, over time, models the opponent/teammate policy and updates the machine learning architecture represented in data fields and/or nodes accordingly.

It is important to recognize that the embodiments herein are not limited to game playing and are extendable to implementations where two agents are competing in relation to an environment, such as, for example, automated or semi-automated agents taking actions in relation to an economic goal (e.g., automated electronic trading), project actions, competition between organizations in a particular industry, etc. Inputs can include environmental condition updates, such as stock trading data flows, traffic/road positional information, inventory system information, among others, and the inputs can be received, for example, by polling information through APIs, among others.

In all of the above cases, AMS-A3C and AMF-A3C can be used to predict the actions of other agents in the environment. Through this process, the deep neural network must learn a representation to predict such actions. The process of learning such a classification task is simpler than learning how to solve the full reinforcement learning problem. Thus, the agent can quickly learn features to address the classification task, which then in turn allows the agent to better learn in the full reinforcement learning problem.

Accordingly, outputs are not limited to game control signals, but rather, can also include control signals for actions taken in relation to automated trading, corporate decision making, among others. These outputs can be encapsulated as data sets representing signals for execution by downstream processors, which conduct actions in accordance with the instructions provided therein in the signals. These actions can control, in the context of a game, the actuation of various buttons or movement controls, in the context of a traffic routing system, commands to modify direction routing or device movements, or in the context of a stock trading platform, trade actions and their associated parameters (e.g., purchase X shares having an order type of Y, along with derivatives Z having a strike price of W).

Similarly, while A3C is described, other asynchronous methods are also contemplated. For example, UNREAL™, or The Reactor™ are also contemplated, among others. Not all embodiments are thus limited to A3C.

The experiments below are shown in relation to various types of opponents and teammates, including static opponents, randomly moving opponents, and rule based opponents (e.g., opponents whose strategies include approaches to stay safe from blasts). In terms of teammates, experiments were run in relation to hesitant and stubborn teammates as well.

An example rule based opponent could, for example, have a rule where if the region where the opponent is it's safe (there are no flames or bombs) and there are is no other agent nearby then it blasts wood and if there is a power-up the opponent collects it, and whenever this opponent is near another agent it places a bomb and moves away from the blast. Accordingly, an example rule-based opponent can avoid staying in the same region of the board for long time, and as a more specific example, a rule-based opponent could use Dijkstra's algorithm at each time-step for finding shortest paths among different points in the board.

In a first aspect, there is provided a computer system for extending parallelized asynchronous reinforcement learning to include opponent modeling for training a neural network is described in various embodiments. The computer system, in some embodiments, is a computer server that can reside within a data center or a distributed set of networked computing resources (cloud implementation), and includes a data storage configured to store one or more data structures representing interconnected computing units of the neural network, including data fields storing weighted interconnections between the interconnected computing units; a plurality of hardware processors or threads of hardware processors; and a parallel processing controller configured for coordinated operation of the plurality of hardware processors or threads of hardware processors.

Each of the plurality of hardware processors or threads of hardware processors functions as a worker process that is configured to simultaneously interact with a target computing environment for local gradient computation based on a loss determination and to update global network parameters based at least on the local gradient computation to train the neural network through modifications of the weighted interconnections between the interconnected computing units as gradient computation is conducted across a plurality of iterations of the target computing environment.

The loss determination includes at least a policy loss term (actor), a value loss term (critic), and a supervised cross entropy loss.

In another aspect, the supervised cross entropy loss is determined between an observed one-hot encoded opponent action and a prediction for a trajectory of length N.

In another aspect, the loss determination includes a second entropy loss that is added to improve exploration by discouraging premature convergence to one or more suboptimal deterministic policies.

In another aspect, the supervised cross-entropy loss is modified by a weight term.

In another aspect, the neural network includes an additional set of features in a latent space adapted to predict opponent policy features.

In another aspect, fully connected layers of the neural network include a first portion adapted for predicting the opponent policy features and a second portion adapted for tracking actor and critic features.

In another aspect, the opponent policy features are conditioned when computing actor and critic outputs.

In another aspect, the conditioning is conducted using element-wise multiplication.

In another aspect, the neural network includes at least 4 convolutional layers, each of which has at least 32 filters and 3×3 kernels, with stride and padding of 1.

In another aspect, the neural network includes at least 2 fully connected layers each of which have 128 hidden units, followed with 2 heads for actor and critic where the critic has a single output for state-value estimate for an observation, and the actor has 6 outputs for the policy probabilities for the observation.

Corresponding methods and computer-readable media are described.

In some embodiments, the computer system is a special purpose machine including at least one computer processor, computer memory, and data storage, the special purpose machine configured for performing any of the above steps in relation to controlling inputs of a video game avatar in a video game, and wherein the loss function is related to a reward function associated with fulfilment of one or more objectives of the video game.

In some embodiments, the computer system is a special purpose machine including at least one computer processor, computer memory, and data storage, the special purpose machine configured for performing any of the above steps in relation to controlling inputs of an automated financial advisor in relation to an electronic trading platform, and wherein the loss function is related to a reward function associated with fulfilment of one or more financial objectives.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 1A is an example illustration of an Asynchronous Advantage Actor-Critic (A3C) approach that utilizes multiple workers without needing an experience replay buffer.

FIG. 1C is an example method diagram showing an example method for extending parallelized asynchronous reinforcement learning to include opponent modeling for training a neural network, according to some embodiments.

FIGS. 2A-2C is a schematic diagram where CNN represents convolutional layers, FC represents fully connected layers, ⊗ represents an element-wise vector multiplication. FIG. 2A shows A3C, which outputs values and the agent's policy. FIG. 2B shows AMS-A3C, which adds another head that predicts the opponent policy. FIG. 2C shows AMF-A3C, which aims to learn opponent policy features in the latent space, $h_{opp}$, which are then used to compute the value and policy of the agent.

FIG. 3A is an example diagram of the Pommerman™ board size at 8×8. The board is randomly generated varying the number of wood (light brown cell), walls (dark brown cell) and power-ups (yellow circle). Initial positions of the agents are randomized close to any of the 4 corners of the board.

FIG. 10B is shown using AMF-A3C: no significant variation; and with the stubborn teammate in FIG. 10C with AMS-A3C and in FIG. 10D with AMF-A3C, showing that for AMF-A3C the best results were obtained with an opponent modeling loss value=0.1.

DETAILED DESCRIPTION

Figure 1A:
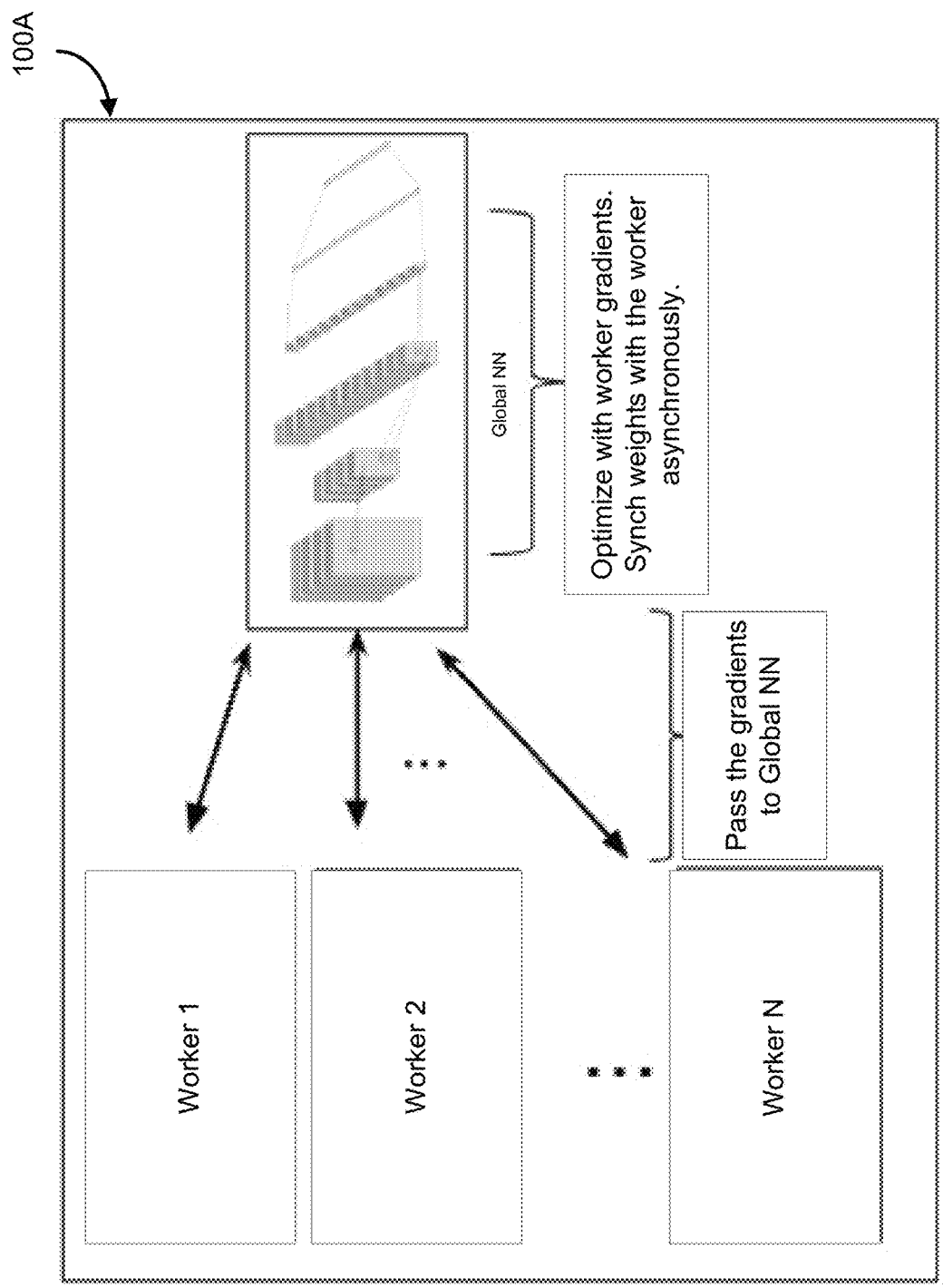
FIG. 1A is an example diagram of an approach for asynchronous reinforcement learning.

The specification is directed to deep reinforcement learning (RL), and in particular, extensions of reinforcement learning and asynchronous methods thereof in relation to modeled agent (e.g., opponents, teammates) policies.

Applicants describe a non-limiting example test A3C in a two-player competitive game (Pommerman™) as well as a two-player cooperative game where modeling the other agent is of crucial importance for winning, but note that the methods, systems, and computer readable media described herein are not limited to such games. Not all embodiments are limited to agents who are operating adversely—teammate modelling is also possible where there is partial or full cooperation towards a goal or goals. An external agent may also be, from time to time, a neutral player (e.g., where the goals are not aligned), a teammate (e.g., where the goals are aligned) or, an opponent (e.g., where the goals are opposed). Shifts can occur even during a same game or event, and the embodiments described herein are adapted for tracking the other agent's policies, regardless of whether they are neutral, a teammate, or an opponent.

Two new architectures are proposed that take inspiration form multiagent DRL and adapt them to work with asynchronous methods.

The first architecture, Agent Modeling by parameter Sharing (AMS-A3C), uses parameter sharing to learn the agent policy as an auxiliary task as well as the standard actor and critic. In some figures, the term OMS is used (opponent) but it should be understood that this can also refer to AMS.

The second architecture, Agent Modeling by policy Features (AMF-A3C), uses agent policy features to learn features in the latent space that are used as input when computing the actor and critic of the learning agent. In some figures, the term OMF is used (opponent) but it should be understood that this can also refer to AMF.

Experimental results showed that the comparison A3C architecture could only obtain competitive results against opponents that executed very simple policies. In contrast, example embodiments of the proposed architectures obtained better learning performance in terms of average rewards compared to the comparison A3C method even against more complex opponents, thus showing that the architectures, augmented with agent modeling, accelerate learning.

Related work on agent modeling in DRL and multiagent DRL includes several different approaches.

Extending DRL algorithms to multiagent environments has posed some challenges: Foerster et al. (Foerster:2017ti) noted that the experience replay buffer introduces problems when using independent DQN agents. Lowe et al. (Lowe:

2017wb) noticed a high variance when using policy gradient methods due to the multiagent nature of the environment. Bansal et al. (Bansal:2017w1) explored the emergent behaviors in competitive scenarios training independent learning agents with PPO [Schulman et al.2017] extended with dense exploration rewards that are annealed through time in order to allow agents to learn basic (non-competitive) behaviors.

Deep Reinforcement Opponent Network (DRON) [He et al.2016] was a DRL work that performed opponent modeling. DRON's idea is to have two networks: one which learns Q values (similar to DQN) and a second one that learns a representation of the opponent's policy. DRON used handcrafted features to define the opponent network. In contrast, Deep Policy Inference Q-Network (DPIQN) and Deep Policy Inference Recurrent Q-Network (DPIRQN) [Hong et al.2018] learned policy features directly from raw observations of the other agents. The way to learn these policy features is by means of auxiliary tasks [Jaderberg et al.2017b] that provide additional learning goals, in this case, the auxiliary task is to learn the opponents' policy. Then, the Q value function of the learning agent is conditioned on the policy features, which aim to reduce the non-stationarity of the multi-agent environment.

A For The Win (FTW) [Jaderberg et al.2018] agent acts in a game where two opposing teams compete to capture each other's flags. FTW proposed a hierarchical two-level representation operating at different timescales and employed population based training [Jaderberg et al.2017a]. Since the environment is partially observable, they did not aim to directly model opponents.

Deep Cognitive Hierarchies (DCHs) [Lanctot et al.2017] is an algorithm based on iterative reasoning [Camerer, Ho, and Chong2004] that generalizes fictitious play. It uses deep reinforcement learning to compute best responses to a distribution over (opponent) policies and empirical game-theoretic analysis [Walsh et al.2002] to compute new meta-strategy distributions.

Self Other Modeling (SOM) [Raileanu et al.2018] proposed using the agent's own policy as a means to predict the opponent's actions. SOM aims to infer other agents' goals by using two networks, one used for computing the agents' policy and Q values, and a second one used to infer the opponent's policy. In contrast to previous approaches, SOM is not focused on learning the opponent strategy but rather on estimating the opponent's goal (hidden state).

Theory of Mind Network (ToMnet) [Rabinowitz et al.2018] propose a three network architecture: a character network that learns from historical information, a mental state network that takes the character output and the recent trajectory, and the prediction network that takes the current state as well as the outputs of the other networks as its input. The goal of the architecture is to predict the opponent's next action.

Learning with Opponent-Learning Awareness (LOLA) [Foerster et al.2018] explicitly accounts for anticipated learning of the other agents. LOLA optimizes the expected return after the opponent updates its policy one timestep. Therefore, a LOLA agent directly shapes the policy updates of other agents to maximize its own reward.

Approaches to distinguish include DRON, DPIQN, ToMnet and SOM. The first two are based on DQN so an analogous comparison is not appropriate. ToMnet focuses on a more complex setting where there are many different types (species) of agents. SOM uses the A3C framework as described in some embodiments do but considers a slightly different scenario of learning a hidden goal of the other agent. Moreover, the approaches described herein could be complementary to SOM. In experiments described herein, the approach includes a comparison of example approaches to the A3C architecture, noting improvements and differences thereof.

An analysis starts with the reinforcement learning setting of an agent interacting in an environment over a discrete number of steps. At time t the agent in state $s_t$ takes an action $a_t$ and receives a reward $r_t$. The state-value function is the expected return (sum of discounted rewards) from state s following a policy $\pi(a|s)$:

$$V^\pi(s) = \mathbb{E}[R_{t:\infty}|s_t=s,\pi],$$

and the action-value function is the expected return following policy $\pi$ after taking action a from state s:

$$Q^\pi(s,a) = \mathbb{E}[R_{t:\infty}|s_t=s,a_t=a,\pi]$$

Approaches, such as Q-learning [Watkins1989], or its (deep) neural network variant, DQN, approximate the action-value function Q(s, a; $\theta$) using parameters $\theta$, and then update parameters to minimize the mean-squared error, using the loss function:

$$L_Q(\theta_i) = \mathbb{E}[(r+\gamma\max_{a'} Q(s',a';\theta_i^-) - Q(s,a;\theta_i))^2]$$

where $\theta^-$ represents the parameters of the target network that is held constant, but synchronized to the behaviour network $\theta^-=\theta$, at certain periods to stabilize learning.

A3C (Asynchronous Advantage Actor-Critic) is an approach that employs a parallelized asynchronous training scheme (using multiple CPUs or multiple threads) for efficiency. It is an on-policy RL method that does not need an experience replay buffer and can work without a GPU. A3C allows multiple workers to simultaneously interact with the environment and compute gradients locally.

All the workers pass their computed local gradients to a global network which performs the optimization and updates with the workers asynchronously (see diagram 100A of FIG. 1A). Note that there is also an A2C method (Advantage Actor-Critic) method that combines all the gradients from all the workers to update the global network synchronously.

A3C maintains a parameterized policy $\pi(a|s; \theta)$ and value function $V(s; \theta_v)$, which are updated as follows:

$$\theta = \nabla_\theta \log \pi(a_t|s_t;\theta) A(s_t,a_t;\theta_v),$$

$$\theta_v = A(s_t,a_t;\theta_v)\nabla_{\theta_v} V(s_t)$$

where, $$A(s_t, a_t; \theta_v) = \sum_{k}^{n-1} \gamma^k r_{t+k} + \gamma^n V(s_{t+n}) - V(s_t),$$

with A(s, a)=Q(s, a)–V(s) representing the advantage function, used to reduce variance, in some embodiments.

The policy and the value function are updated after every $t_{max}$ actions or when a terminal state is reached. It is possible to use one softmax output for the policy $\pi(a_t|s_t; \theta)$ head and one linear output for the value function $V(s_t; \theta_v)$ head, with all non-output layers shared (see FIG. 2A).

The loss function for A3C comprises two terms: policy loss (actor), $\mathcal{L}_\pi$, and value loss (critic), $\mathcal{L}_v$. An entropy loss for the policy, $H(\pi)$, can be added which helps to improve exploration by discouraging premature convergence to suboptimal deterministic policies.

Thus, the loss function is given by, $$\mathcal{L}_{A3C} \approx \mathcal{L}_v + \mathcal{L}_\pi - \mathbb{E}_{s\sim\pi}[H(\pi(s,\cdot,\theta))]$$

with $\lambda_v=0.5$, $\lambda_\pi=1.0$, and $\lambda_H=0.01$, for example, as weighting terms on the individual loss components.

The UNsupervised REinforcement and Auxiliary Learning (UNREAL) framework is built on top of A3C. In particular, UNREAL proposes unsupervised auxiliary tasks to speed up the learning process that requires no additional feedback from the environment. The additional auxiliary predictions help the agent to focus on important aspects of the task.

UNREAL proposes two auxiliary tasks: auxiliary control and auxiliary prediction that share the previous layers that the base agent uses to act. By using this jointly learned representation, the base agent learns to optimize extrinsic reward much faster and, in many cases, achieves better policies at the end of training.

The UNREAL framework optimizes a single combined loss function with respect to the joint parameters of the agent that combines the A3C loss, $\mathcal{L}_{A3C}$, together with an auxiliary control loss $\mathcal{L}_{PC}$, an auxiliary reward prediction loss $\mathcal{L}_{RP}$ and a replayed value of loss $\mathcal{L}_{VR}$ as follows:

$$\mathcal{L}_{UNREAL}=\mathcal{L}_{A3C}+\lambda_{VR}\mathcal{L}_{VR}+\lambda_{PC}\mathcal{L}_{PC}+\lambda_{RP}\mathcal{L}_{RP}$$

where $\lambda_{VR}$, $\lambda_{pc}$, and $\lambda_{RP}$ are weighing terms on the individual loss components.

In contrast to A3C, UNREAL uses an experience replay buffer that is sampled with more priority given to interactions with positive rewards to improve the critic network.

Figure 1B:
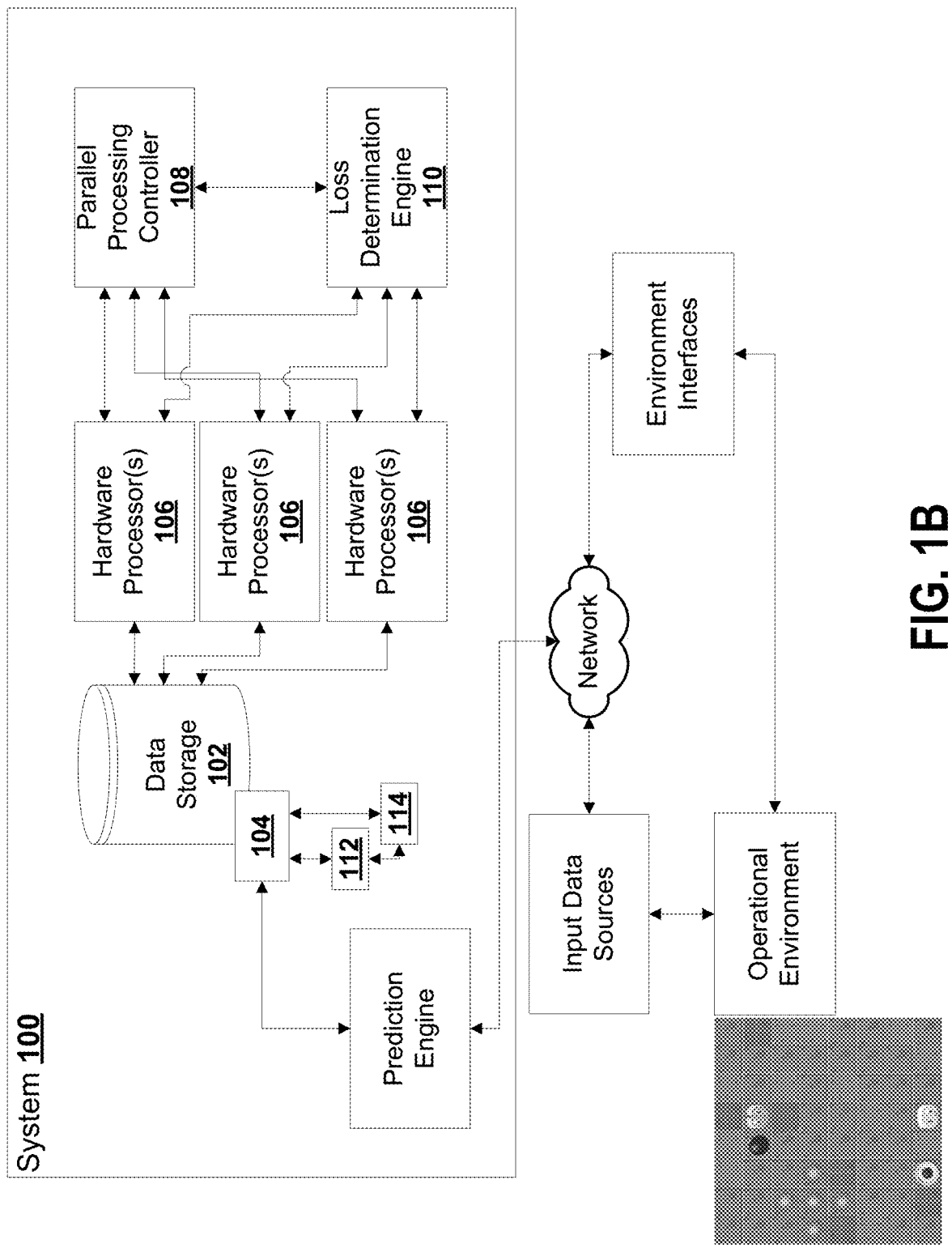
FIG. 1B is a block schematic of a computer system for extending parallelized asynchronous reinforcement learning to include opponent modeling for training a neural network, according to some embodiments.

FIG. 1B is a block schematic of a computer system for extending parallelized asynchronous reinforcement learning to include agent modeling for training a neural network, according to some embodiments.

Referring to FIG. 1B, the computer system 100, in some embodiments, is a computer server that can reside within a data center or a distributed set of networked computing resources (cloud implementation), and includes a data storage 102 configured to store one or more data structures representing interconnected computing units of the neural network 104, including data fields storing weighted interconnections between the interconnected computing units; a plurality of hardware processors or threads of hardware processors 106; and a parallel processing controller 108 configured for coordinated operation of the plurality of hardware processors or threads of hardware processors.

FIG. 1C is an example method diagram showing an example method 100C having steps 152-156 for extending parallelized asynchronous reinforcement learning to include agent modeling for training a neural network, according to some embodiments. At 152, each of the plurality of hardware processors or threads of hardware processors 106 functions as a worker process that is configured to simultaneously interact with a target computing environment for local gradient computation. Local gradient computation, at 154, is based on a loss determination and used at 156 to update global network parameters based at least on the local gradient computation by a loss determination engine 110, which train the neural network 104 through modifications of the weighted interconnections between the interconnected computing units as gradient computation is conducted across a plurality of iterations of the target computing environment.

The loss determination by the loss determination engine 110 includes at least a policy loss term (actor), a value loss term (critic), and a supervised cross entropy loss, and the supervised cross entropy loss can be determined between an observed one-hot encoded agent action and a prediction for a trajectory of length N, and in some embodiments, the loss determination includes a second entropy loss that is added to improve exploration by discouraging premature convergence to one or more suboptimal deterministic policies. In another aspect, the supervised cross-entropy loss is modified by a weight term.

In another aspect, in particular, directed to a variant architecture described herein as AMF-A3C, the neural network 104 includes an additional set of features in a latent space adapted to predict agent policy features. In this variation, fully connected layers of the neural network 104 include a first portion 112 adapted for predicting the agent policy features and a second portion 114 adapted for tracking actor and critic features. In an embodiment, the agent policy features are conditioned when computing actor and critic outputs, and the conditioning can include element-wise multiplication.

As described below, particulars in relation to the challenges of agent modeling in the context of reinforcement learning and multiagent systems are noted, and the variant proposed architectures (AMS-A3C and AMF-A3C) are described in further detail.

In a multiagent environment, agents interact at the same time with environment and potentially with each other [Busoniu, Babuska, and De Schutter2008]. FIG. 1A is an example diagram 100A of an Asynchronous Advantage Actor-Critic (A3C) approach that utilizes multiple workers without needing an experience replay buffer. Workers can be, for example separate functions or processes (e.g., of a parallelized computing infrastructure).

Each worker has its own network and independently interacts with the environment to compute the loss and gradients. Workers then pass computed gradients to the global network that optimizes the parameters and updates with the worker asynchronously.

These environments are formalized as a Markov game (S, N, A, T, R), which can be seen as an extension of an MDP to multiple agents. One key distinction is that the transition, T, and reward function, R, depend on the actions of all, N, agents.

Given a learning agent i and using the common shorthand notation $-i=N\setminus\{i\}$ for the set of opponents, the value function now depends on the joint action $a=(a_i, a_{-i})$, and the joint policy $\pi(s, a)=\Pi_j \pi_j(s, a_j)$:

$$V_i^\pi(s) = \sum_{a \in A} \pi(s, a) \sum_{s' \in S} T(s, a_i, a_{-i}, s')$$

$$[R(s, a_i, a_{-i}, s') + \gamma V_i(s')].$$

which results in that the optimal policy is a best response dependent on the other agents' policies $$\pi_i^*(s, a_i, \pi_{-i}) = \operatorname*{argmax}_{\pi_i} V_i^{(\pi_i, \pi_{-i})}(s)$$

However, if the opponents' policy is stationary, then the problem can be reduced to a MDP where RL algorithms can be used to effectively learn a best response to those opponents.

Then, an objective of some embodiments described herein is to accurately estimate the agent policy at the same time that the agent is learning its respective (best response) policy.

Since these two elements are linked to each other, below Applicants propose architectures that take advantage of this realization. As described further herein, Applicants show advantage of agent policy prediction with respect to non-learning agents.

AMS-A3C

A first architecture is described herein which builds on the concept of parameter sharing and auxiliary tasks. Parameter sharing has been proposed in multiagent DRL as a way to reduce the number of parameters to learn and improve the learning performance. An approach is to perform a centralized learning where all agents share the same network (i.e., parameters) but the outputs represent different agent actions.

FIGS. 2A-2C is a schematic diagram showing architectures 200A, 200B, and 200C, where CNN represents convolutional layers, FC represents fully connected layers, ⊗ represents an element-wise vector multiplication. FIG. 2A shows A3C, which outputs values and the agent's policy.

The architectures can be used to represent a neural network that is modified over a period of training. Inputs into the neural network can include data sets representing a set of environmental features, which, in some embodiments, can include transaction logs (e.g., in the context of a stock trading system, obtained through APIs with stock exchanges), traffic logs (e.g., positions/velocities of cars, traffic light statuses), game conditions (e.g., in a simplest version, what is appearing on the graphical user interface, or representations thereof [e.g., a representation of a chess board]), among others. These environmental features can be directly obtained from the source (e.g., a graphical user interface showing a chess board), or can be distilled into pre-processed inputs (e.g., a compressed or expanded chess board representation, for example, noting piece advantage/disadvantage, bishop pairs, linked rooks).

The neural network of any one of FIGS. 2A-2C are then updated over epochs of training such that values and policies are tracked. The trained neural network can be coupled to output nodes, which can represent some or all of the available actions for the agent under training. In a simplified example, if the agent under training is being trained to play a game mapped to the buttons of a game controller pad, the output would be each of the various buttons. Similarly, if the output is car control for a traffic routing mechanism, the output could be whether a particular car should accelerate/decelerate, turn left, turn right, among others.

The trained neural network can be thus used to inform which of the actions to take. Inputs are given and processed, and the output nodes can be provided logit values from the neural network. If there is sufficient separation, for example, from other logits assigned to other actions, it may be indicative which actions the neural network predicts would be best over other actions.

There may be multiple actions that are indicated to be superior (e.g., there doesn't need to only be one best option). To test that the neural network is effective, later opponent/teammate actions can be tracked and/or reward processes can be used to tune the network based on feedback in relation to the accuracy of current predictions and future observations (e.g., the opponent/teammate policy suggested that the opponent would move down in reaction to a movement upwards, but this did not happen, so re-tuning may be required).

Two heads are necessary so that the agent can learn a policy (actor) and an estimate of the strength of the policy (critic). FIG. 2B shows AMS-A3C, which adds another head that predicts the opponent policy, supplementing the actor-critic architecture. In the case where there are multiple opponents/teammates, an extra head will be needed for each agent being predicted. FIG. 2C shows AMF-A3C, which aims to learn agent policy features in the latent space, $h_{opp}$, which are then used to compute the value and policy of the agent. The motivation is that adding an extra layer of abstraction may yield a better representation of the opponent/teammate being modeled, which can then be better used by the agent to compute its own actor and critic heads.

The potential drawback of AMF-A3C, relative to AMS-A3C, is that the extra layer of abstraction may make it more difficult to model the opponent/teammate. It is yet to be determined when the extra abstraction will be most useful. Both AMF-A3C and AMS-A3C can be scaled to N agents (e.g., a mix of opponents and teammates).

In FIG. 2C, an additional layer is added to add more neural network structure that does not directly influence the predicted output nodes. This additional layer provides an extra ability to model the opponent. The system can better estimate what they're doing but the system has additional parameters, potentially increasing complexity, relative to the variant embodiment of FIG. 2B. However, additional parameters may provide for a technical improvement whereby training speed is reduced.

The variation of FIG. 2C is not necessarily the only mechanism for additional modelling using the latent space. For example, other approaches can include using a LSTM that helps model the opponent/teammate, and there may not always be an element wise multiplication. In a variation of FIG. 2C, for example, the lower left FC layer can directly connect to the FC layer of the upper right.

The latent space can be defined as an abstraction that occurs between layers—not mapped to any one output. The latent space could be between the two fully connected layers
represented by the values provided into them and the weights established between them. The latent space can occur even in a shallow network, but would work better with a deeper network.

Building on the same principle, in the architecture, the system is adapted to predict the agent policy as well as the standard actor and critic, with the key characteristic that the previous layers will share all their parameters, see FIG. 2B. The change in the architecture is accompanied by a modification in the loss function. In this case, the approach treats the learning of the agent policy as an auxiliary task by refining the loss function as:

$$\mathcal{L}_{AMS-A3C} = \mathcal{L}_{A3C} + \frac{1}{N}\sum_{i}^{N} \lambda_{AM_i} \mathcal{L}_{AM_i}$$

where $\pi AM_i$, is a weight term and $$\mathcal{L}_{AM_i} = -\frac{1}{M}\sum_{j}^{M} a_i^j \log(\hat{a}_i^j)$$

is the supervised cross entropy loss between the observed one-hot encoded agent action (ground truth), $a_i^j$, and the prediction, $\hat{a}_i^j$, for a trajectory of length N.

AMF-A3C

The second architecture uses the concept of policy features. Hong et al. proposed a DQN modified architecture which conditions Q-values of the learning agent on features in the latent space that also predict the agent policy, i.e., agent policy features.

The approach described herein is in relation to A3C. In contrast to AMS-A3C, in this case, after the convolutional layers the fully connected layers are divided in two sections, one specialized in the agent policy 112 and the other in the actor and critic 114. The approach directly uses agent policy features, $h_{opp}$, to be conditioned (via an element-wise multiplication) when computing actor and critic, see FIG. 2C. The agent policy features provide an additional layer of abstraction within the neural network architecture. The loss function is the same as AMS-A3C:

$$\mathcal{L}_{AMF-A3C} = \mathcal{L}_{A3C} + \frac{1}{N}\sum_{i}^{N} \lambda_{AM_i}\mathcal{L}_{AM_i}$$

Implementation Example

Applicants established an example environment for analysis and validation of operational aspects of some embodiments described herein, but other, different, and alternate variations for implementation are contemplated. For generating A3C, AMS-A3C, and AMF-A3C models for comparison, Applicants used 4 convolutional layers, each of which has 32 filters and 3×3 kernels, with stride and padding of 1.

For A3C and AMS-A3C the convolutional layers are followed with 2 fully connected layers each of which have 128 hidden units, followed with 2-heads for actor and critic where the critic has a single output for state-value estimate for the observation, and the actor has 6 outputs for the policy probabilities for the given observation.

There may, for example, be 2 types of layers, among others: Fully connected layers: This is a general purpose connection layer and makes no assumptions about the features in the data. Each neuron is connected to every neuron in the previous layer, and each connection has its own weight. Convolutional layers: More specialized than fully connected, the general idea of using these layers is to find the features that can be relevant for the given task.

Various types of networks are possible, including, for example LSTM/RNN layers: This layers provide a type of memory to the neural network and a use is to have the last layer of the network as this type instead of the fully connected layer.

For AMF-A3C, the fully connected layers have 64 units (to keep the same number of weights as AMS-A3C). For AMS-A3C and AMF-A3C, the agent policy head has 6 outputs corresponding to the agent policy. ELU (Exponential Linear Unit) activation functions were used.

The parameters of all architectures have entropy weight of 0.01, a value loss weight of 0.5, and a discount factor of 0.99. The parameters of the agents policies are optimized using Adam with lr=0.0001,=0.9, $\beta_2$=0.999, $\epsilon$=1×10$^{-8}$, and weight decay 1×10$^{-5}$.

Regarding the use of the 4 convolutional and 2 fully connected layers, other implementations are possible, and Applicants note that usually larger/deeper networks take longer to train, but it is not a limitation. For example, one could increase the number of convolutional or fully connected layers, or replace the last fully connected layer with an LSTM layer as noted above.

Figure 3B:
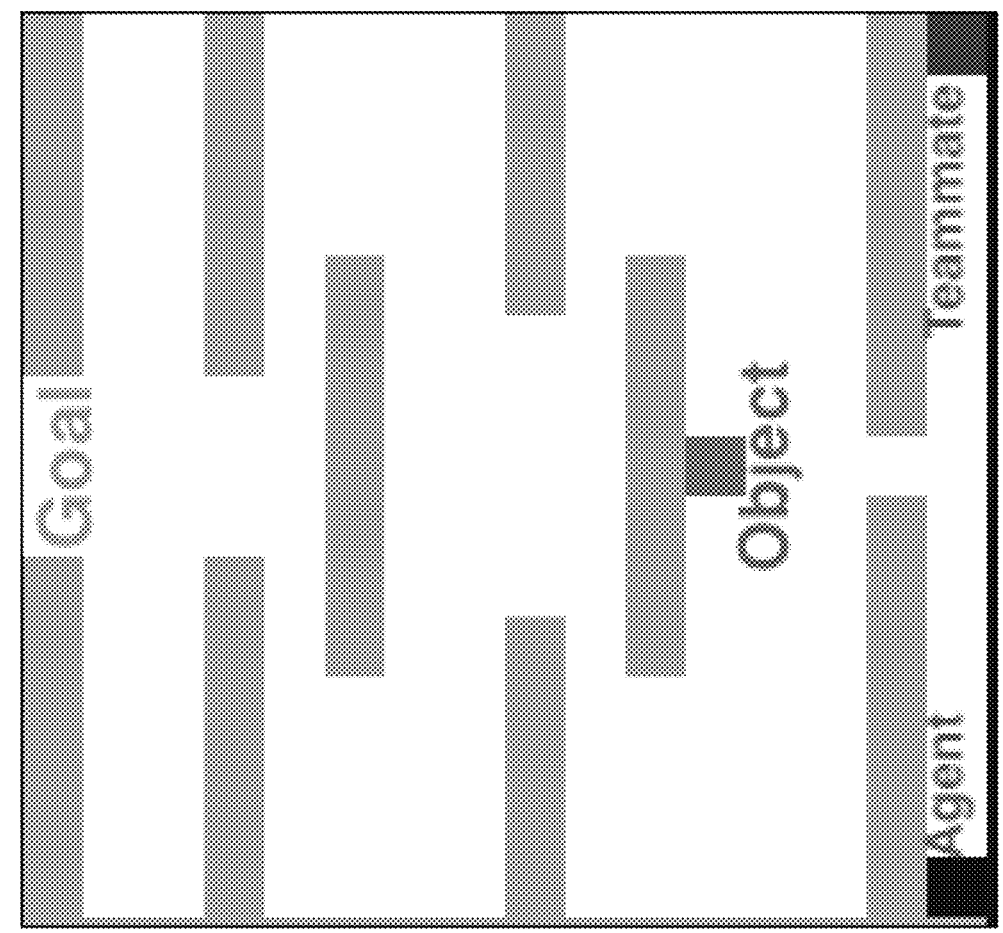
FIG. 3B is an example diagram of a cooperative game where multiple agents can cooperate in achieving a goal.

FIG. 3A is an example diagram 300A of the Pommerman™ board size at 8×8. The board is randomly generated varying the number of wood (light brown cell), walls (dark brown cell) and power-ups (yellow circle). Initial positions of the agents are randomized close to any of the 4 corners of the board. FIG. 3B is an example diagram 300B of an environment for an example cooperative task.

EXPERIMENTAL RESULTS

This section describes two experimental domains: a cooperative multi-agent transport moving problem and a competitive mini version of Pommerman. Applicants then present the experimental results in terms of sensitivity of the loss weight parameter $\lambda_{AM}$ for AMS-A3C and AMF-A3C in the coordination domain, and then compare with A3C in terms of rewards for the two domains.

The experimental setup and results are described further.

Coordination: In this domain two agents are tasked with delivering one object to a goal within a grid-world. The agents must locate and pick up the object by standing in the grid cells on the left and right hand side. The task is fully cooperative, i.e., objects can only be transported upon both agents grasping the item (this happens automatically when situated next to the object) and choosing to move in the same direction. Agents only receive a positive reward after placing the object in the goal, see the labelled goal of FIG. 3B.

Agents have 1900 time steps to complete this task, otherwise the object is reset to the starting position. The actions available to each agent are to either stay in place or move left, right, up, or down. Applicants tested two teammates: one hesitant agent which moves randomly but with higher probability towards the object and once it has grasped it then moves with higher probability towards the goal; and a stubborn agent which prefers to follow a certain path after grasping the object (i.e., some actions are fully deterministic). Agents receive one observation per time step from the environment as a 16×16 pixel representation. Applicants used 12 CPU workers in these experiments.

Competition: The Pommerman™ environment is based off of the classic console game Bomberman. Experiments described herein use the simulator in a mode with two agents, see FIG. 3A. Each agent can execute one of 6 actions at every timestep: move in any of four directions, stay put, or place a bomb. Each cell on the board can be a passage, a rigid wall, or wood. The maps are generated randomly, albeit there is always a guaranteed path between any two agents. The winner of the game is the last agent standing and receives a reward of 1.

Whenever an agent places a bomb it explodes after 10 timesteps, producing flames that have a lifetime of 2 timesteps. Flames destroy wood and kill any agents within their blast radius. When wood is destroyed either a passage or a powerup is revealed.

Power-ups can be of three types: increase the blast radius of bombs, increase the number of bombs the agent can place, or give the ability to kick bombs. A single game of two-player Pommerman™ is finished when an agent dies or when reaching 800 timesteps.

Pommerman™ is a very challenging benchmark for RL methods. The first challenge is that of sparse and delayed rewards. The environment only provides a reward when the game ends, either 1 or −1 (when both agents die at the same timestep they both get −1).

An issue is the randomization over the environment since the number of wood, walls, and power-ups was randomized at every game episode, as well as the initial positions of the agents. The last complication is the multiagent component (best response)—for an agent to win the game it needs to kill the agent. For these reasons, this game is considered complicated for many standard RL algorithms and a local optimum is commonly learned, i.e., not placing bombs.

Applicants considered the rule-based opponent baseline that comes within the simulator (a.k.a. SimpleAgent). Its behaviour is stochastic since it collects power-ups and places bombs when it is near an opponent. It is skilled in avoiding blasts from bombs. It uses Dijkstra's algorithm on each time-step, resulting in longer training times. Applicants evaluated two proposed architectures and the standard A3C against the opponents mentioned above. In all cases, Applicants provided learning agents with dense rewards and Applicants did not tune those reward terms. In the experimental setting, the entire board is visible and agents receive one observation per time step from the environment as a 18×8×8 matrix which contains the current time step board description of the board for the current time step, similar to Resnick et al. (2019).

Figure 10A:
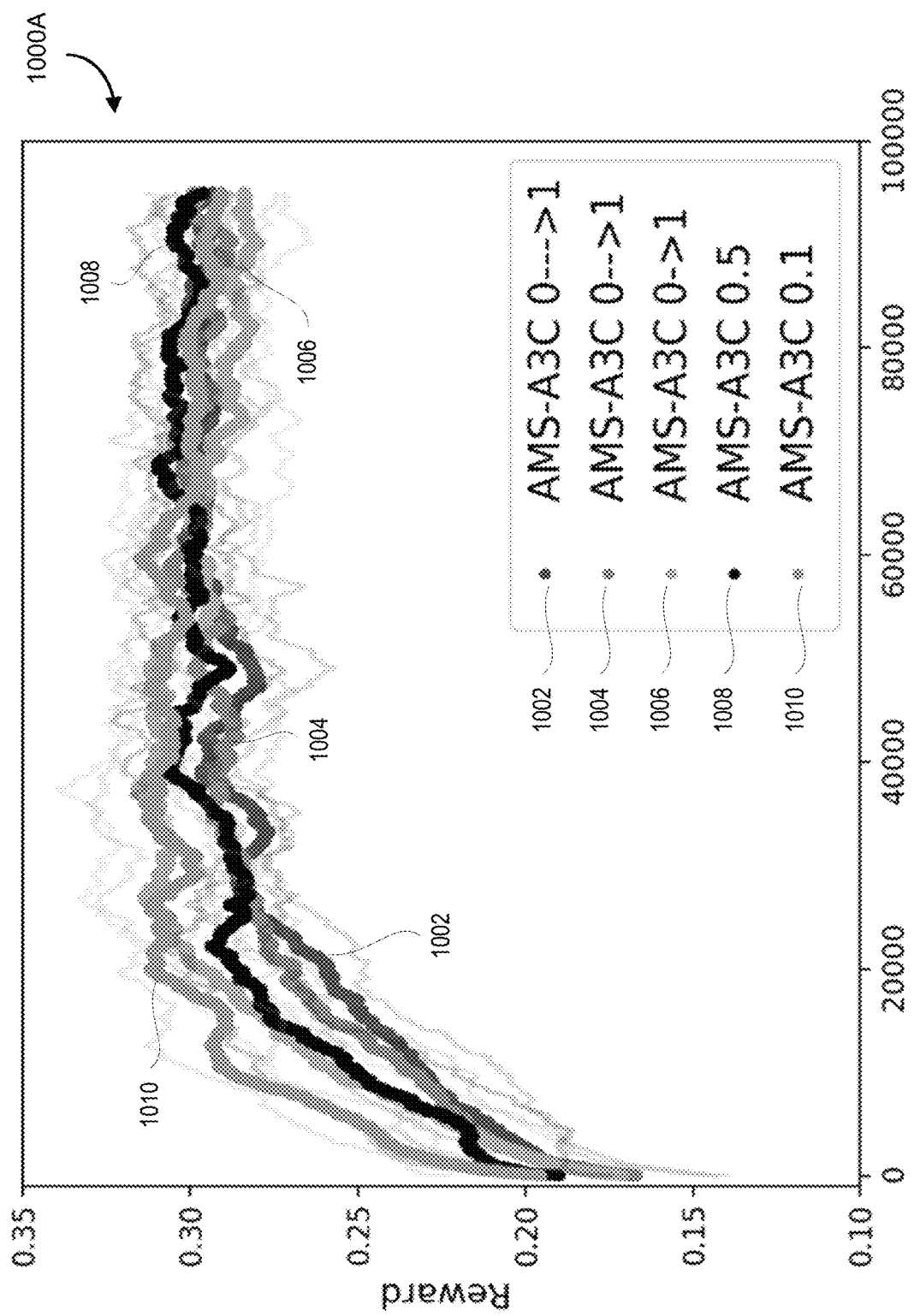
FIGS. 10A, 10B, 10C, and 10D illustrate comparisons for the weight for the opponent modeling loss value annealing 1.0→0.0 with varying discount rates (exponentially) or fixing the value, according to some embodiments. Learning curves in the coordination domain with the hesitant teammate for FIG. 10A is shown in AMS-A3C
Figure 10B:
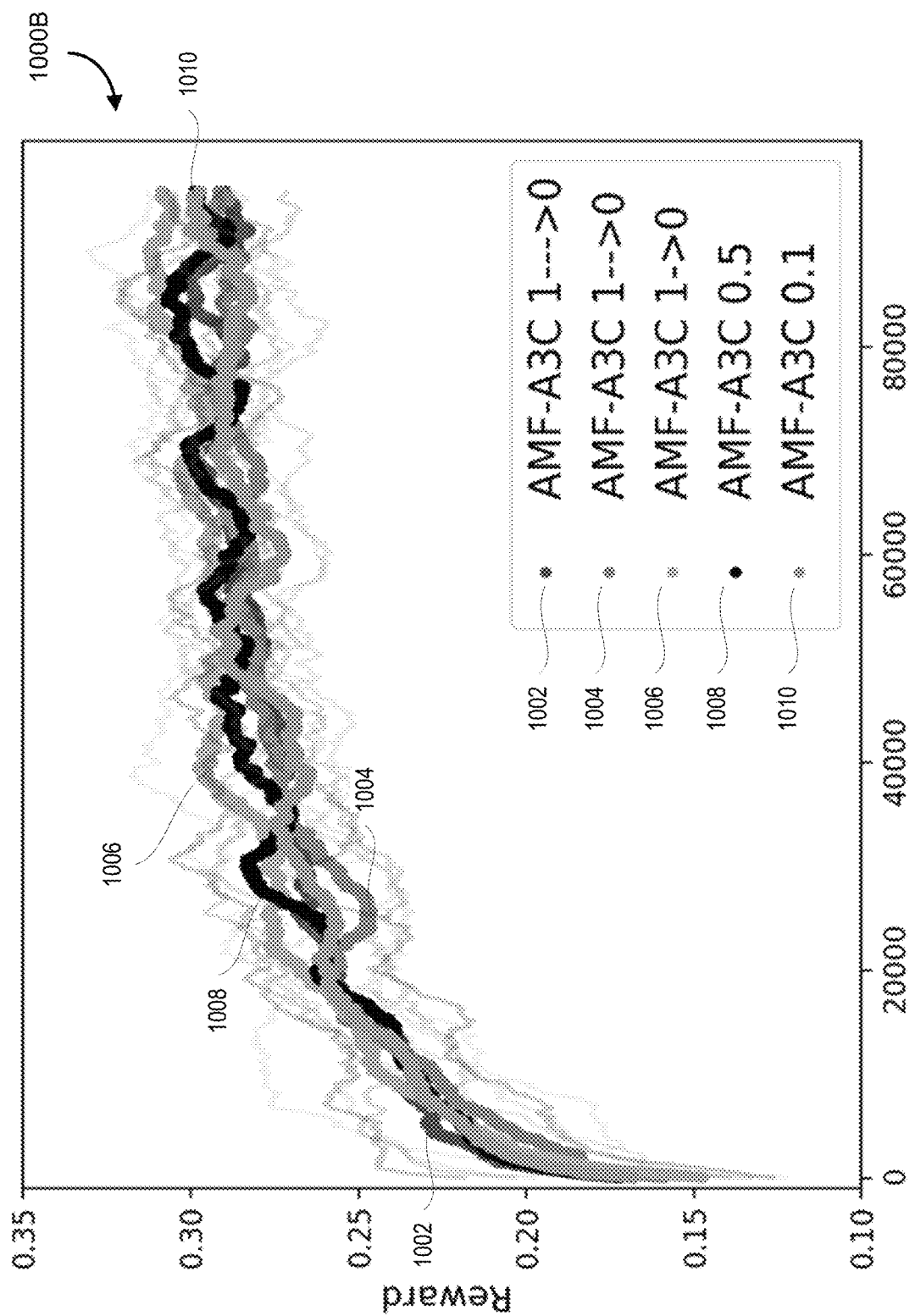
Figure 10C:
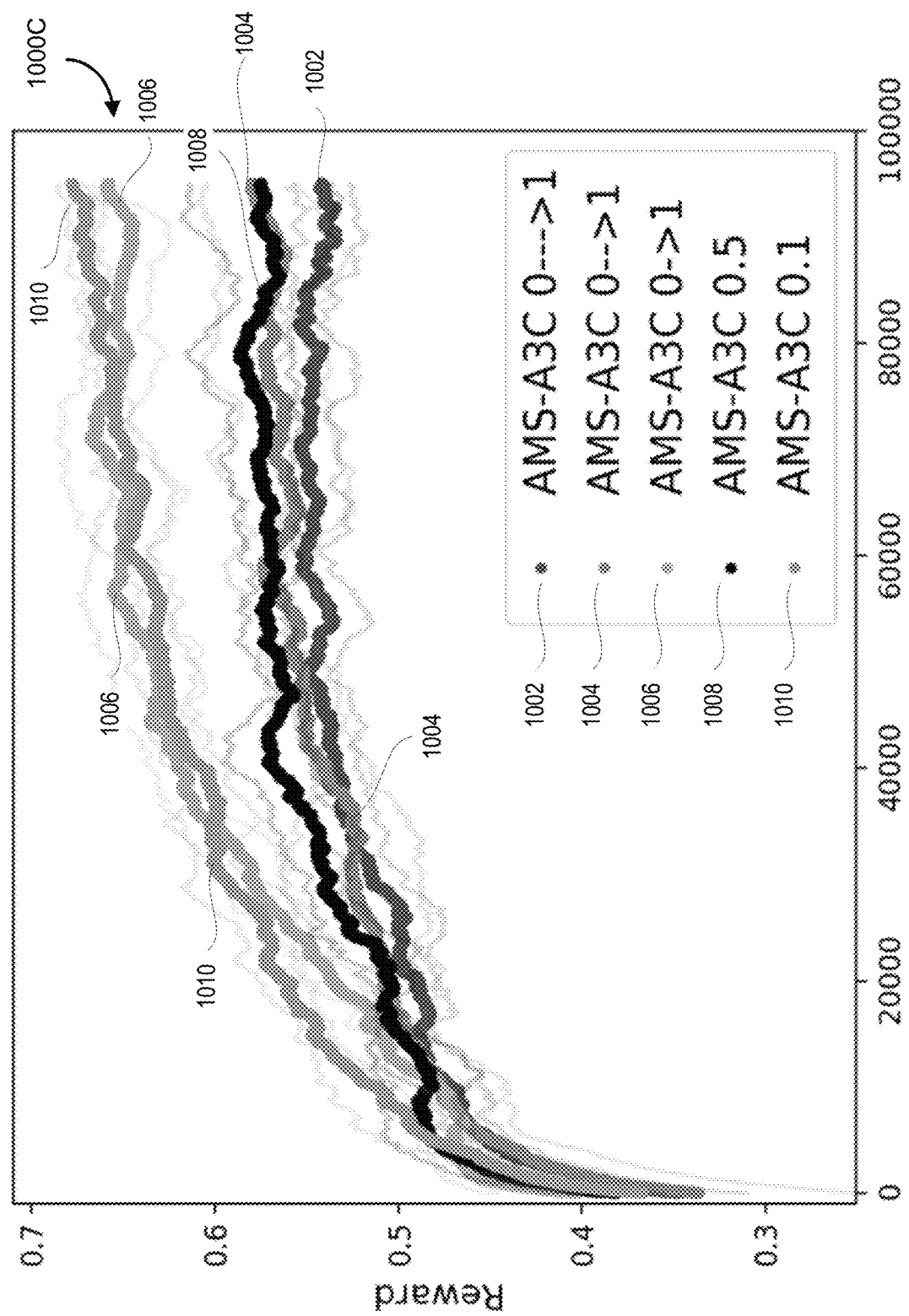
Figure 10D:
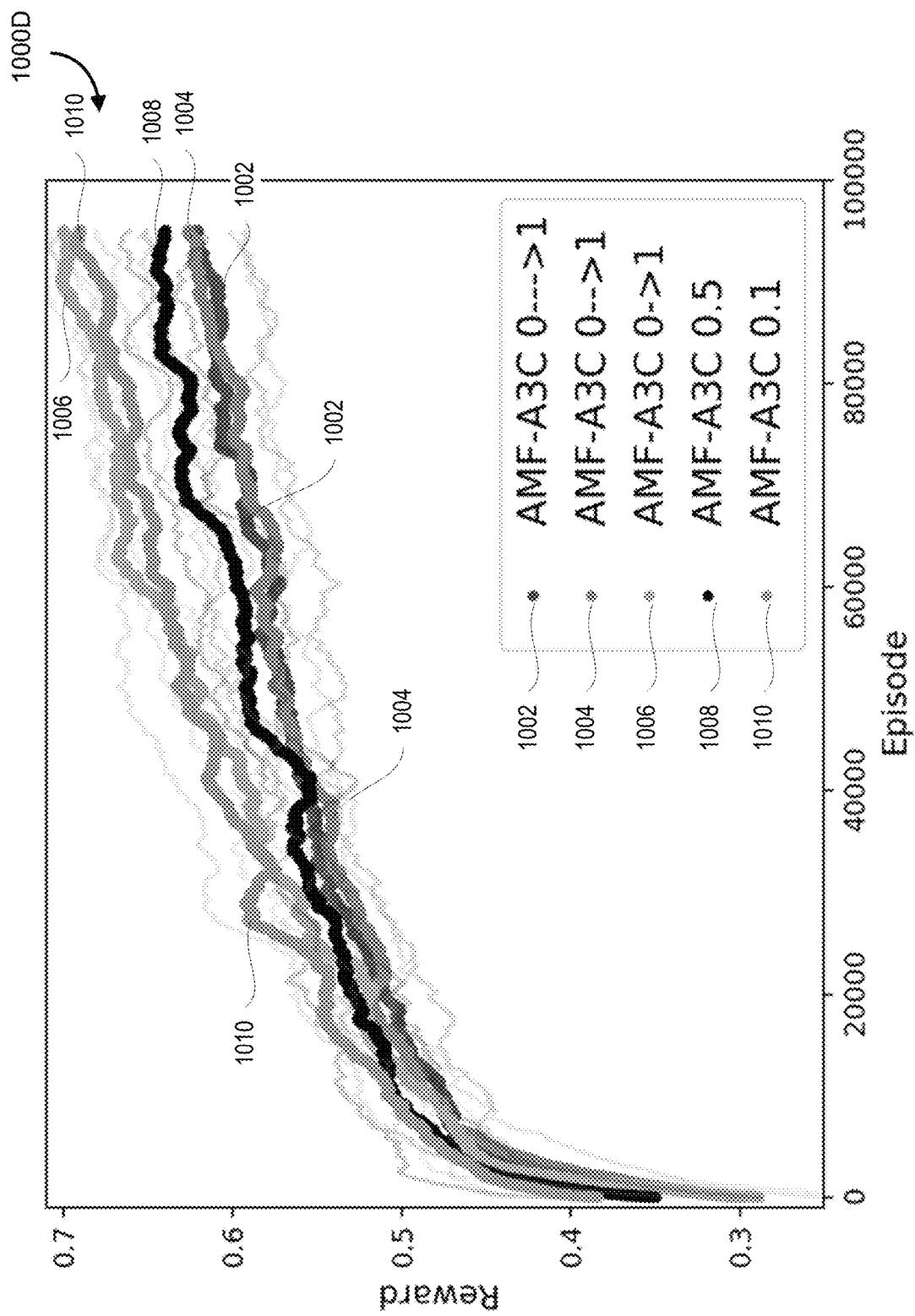

Results: Sensitivity of $\lambda_{AM}$: In the first set of experiments Applicants used the coordination domain to evaluate different weights for the opponent modeling loss value: annealing $\lambda_{AM}=1.0 \rightarrow 0.0$ or keeping the value fixed with $\lambda_{AM}=\{0.1, 0.5\}$. With the hesitant teammate both AMS-A3C and AMF-A3C show similar behavior for all the evaluated parameters (better than A3C), see FIG. 10A (diagram 1000A) and FIG. 10B (diagram 1000B). When testing with the stubborn teammate, Applicants observed more variation among parameters, for both AMS-A3C and AMS-A3C using a fixed $\lambda_{AM}=0.1$ or quickly annealing with 0:999 gave the best results, see FIG. 10C (diagram 1000C) and FIG. 10D (diagram 1000D).

AMS-A3C, 0→1 is shown at 1002, AMS-A3C, 0→1 is shown at 1004, AMS-A3C, 0→1 is shown at 1006, AMS-A3C, 0.5 is shown at 1008, and AMS-A3C 0.1 is shown at 1010.

Applicants' hypothesis is that this teammate is easier to learn and the network does not need too much weight on their modeling; instead it can focus on policy learning.

Figure 11A:
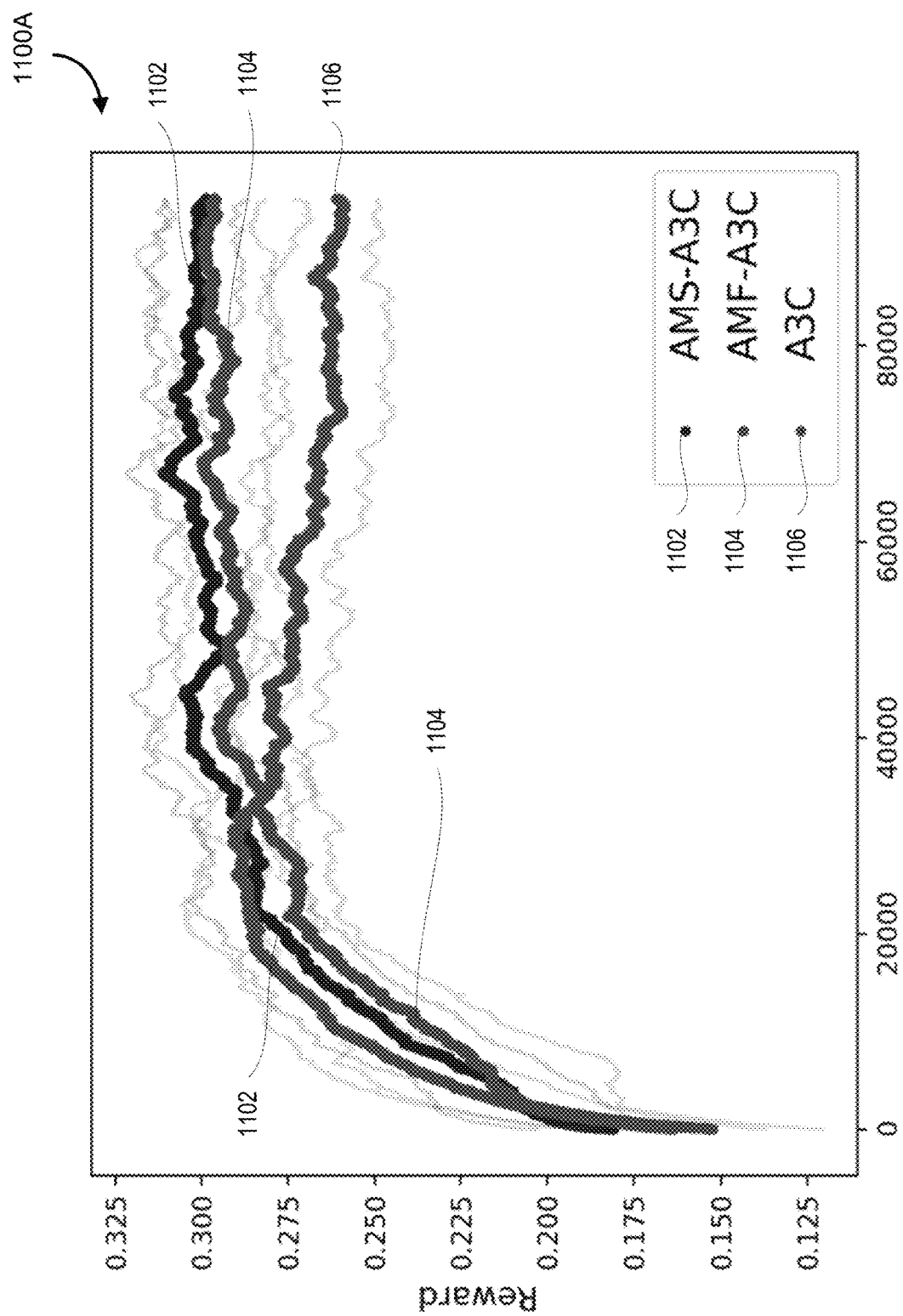
FIG. 11A and FIG. 11B are shown in relation to the coordination domain: Learning curves with two different teammates, hesitant (FIG. 11A) and stubborn (FIG. 11B), according to some embodiments. Vanilla A3C shows instability and even reduces its rewards after some episodes, in contrast, AMSA3C and AMF-A3C are more stable, with lower variance and higher rewards.
Figure 11B:
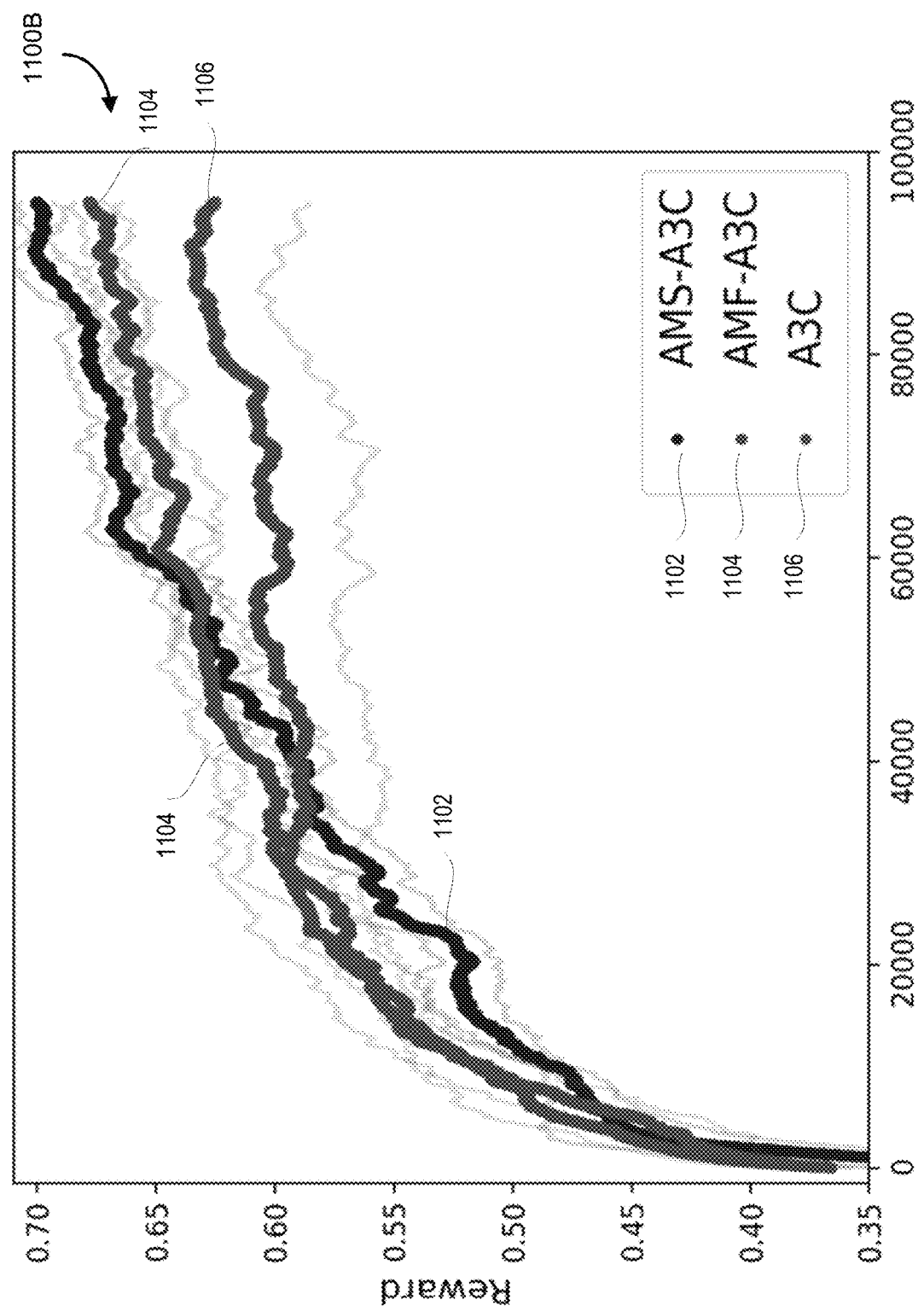

Coordination: Using the best parameters for AMS-A3C and AMF-A3C Applicants compare to A3C. FIG. 11A and FIG. 11B provide graphs 1100A, 1100B that depict learning curves 1102, 1104, and 1106, (average with standard deviations of 10 runs) where it can be seen that in the first part of the learning (30 k episodes), all learning agents behave similarly, however, in the long run AMS-A3C and AMF-A3C obtained higher rewards than A3C (AMS-A3C was statistically significantly better than A3C from episode 60 k, a=0.05). Because of the stochasticity of the opponent actions an upper bound of the expected reward is ~0.7 (experimentally computed) with the selected parameters.

Applicants noted that against the hesitant teammate A3C decreases its rewards, likely because of its on-policy nature, see FIG. 11A. In contrast, AMS-A3C and AMF-A3C show stability and start increasing their rewards. When facing the stubborn teammate, AMS-A3C and AMF-A3C show less variance than A3C due to their accurate agent modeling (AMSA3C is statistically significant over A3C from episode 90 k with a=0:05), see FIG. 11B. Examining the trained agents, AMS-A3C and AMF-A3C show better coordination skills once the object is grasped compared to A3C, i.e., agents reached the goal faster once grabbing the object.

Figure 12:
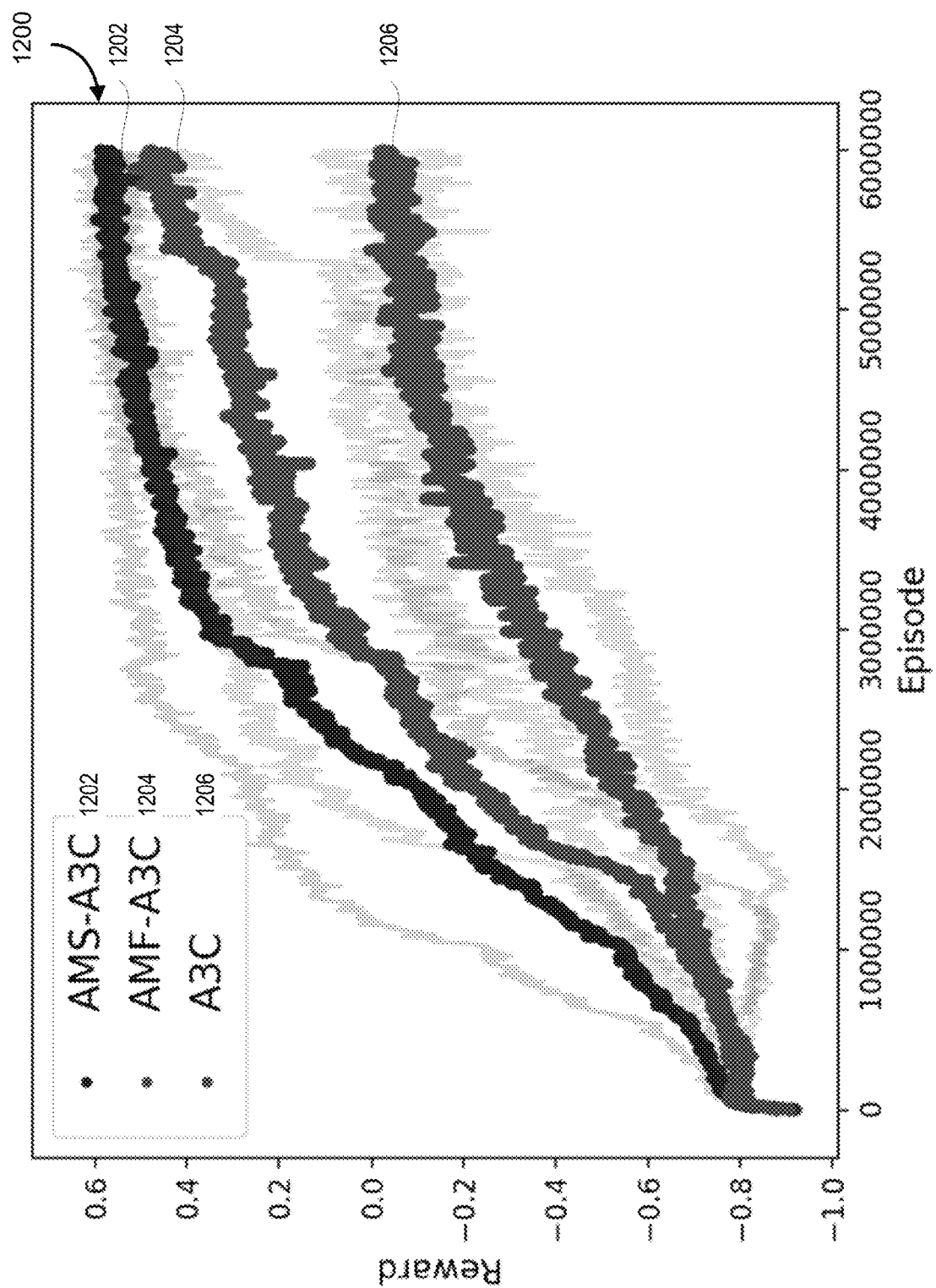
FIG. 12 shows a moving average over 10 k games of the rewards (shaded lines are standard deviation over 5 runs) obtained by two variant architectures and A3C against the rule-based opponent: AMS-A3C and AMF-A3C obtained significantly higher scores than A3C.

Competition: One clear distinction from the previous domain is that it is more elaborate and stochastic (board is randomized and changes depending on the agents' actions). In this experiment, Applicants set $\lambda_{AM}=0.01$ and evaluate against the rule-based opponent. In this case, Applicants let the learning agents train for 6 million episodes to guarantee convergence (~3 days of training with 50 workers). Results are depicted in diagram 1200 in FIG. 12 (with standard deviations over 5 runs), where it can be seen that AMS-A3C and AMF-A3C both clearly outperform A3C in terms of rewards (AMS-A3C is statistically significant over A3C from episode 3.5M and AMF-A3C from 5.5M, a=0.05). When observing the policies generated Applicants noted that during game play the agents trained with AMS-A3C and AMF-A3C were able to make the opponent destroy itself by blocking its moves (in Pommerman, if two agents simultaneously want to move to the same cell, they both stay in their current locations) and make it stand on the path of the flames, in contrast to A3C which was unable to learn this strategy and obtained lower rewards.

Figure 13A:
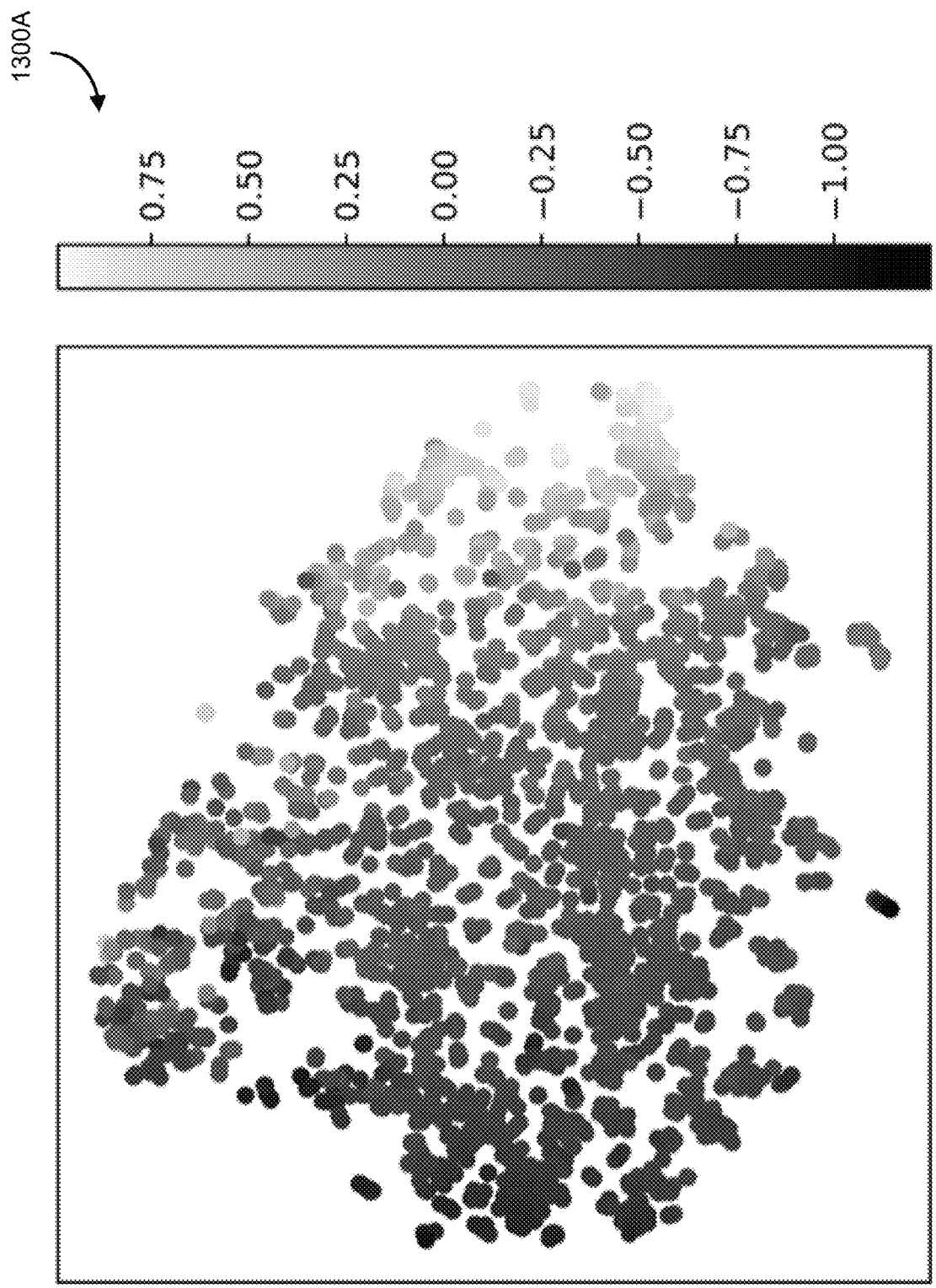
FIG. 13A and FIG. 13B show T-SNE analyses from trained (a) A3C (FIG. 13A) and (b) AMS-A3C agents (FIG. 13B) from 100 episodes (colors are obtained from the value head). AMS-A3C t-SNE shows many more clusters, in particular, the cluster highlighted on the left corresponds to states when AMS-A3C is about to win the game (value close to 1).
Figure 13B:
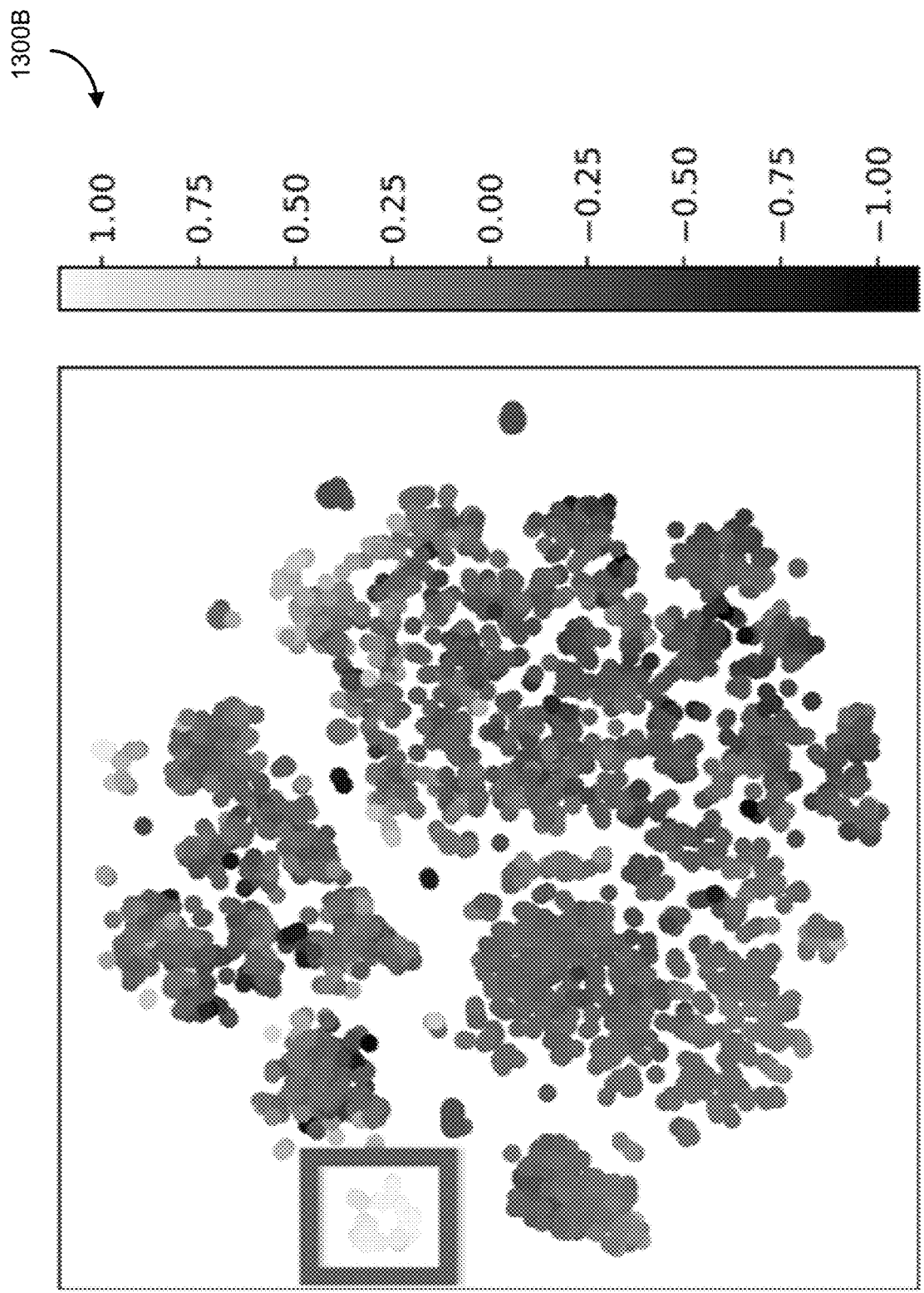

Applicants performed a visual analysis similar to Zahavy, Ben-Zrihem and Mannor (2016). Applicants took trained agents of A3C and AMS-A3C and for 100 episodes we recorded both the activations of the last layer and the value output. Applicants applied t-SNE (Maaten and Hinton 2008) on the activations data (as input) and the value outputs (as labels). FIG. 13A and FIG. 13B depicts the t-SNEs 1300A and 1300B where it can be seen that AMS-A3C has more well-defined clusters than A3C's, in particular the highlighted cluster on the left represents states when AMSA3C is about to win the game because it can accurately predict the opponent's moves, which implies values close to 1.

Experimental Setup (Competitive): Applicants considered three types of agents in Applicants' experiments:
    Static opponent. The opponent just waits in the initial position and always executes the 'stay put' action.
    Random moving opponent. This agents does not place bombs; it only moves randomly using the four possible directions and the stay put action.
    Rule-based opponent. This is a baseline agent within the simulator. It collects power-ups and places bombs when it is near an opponent. It is skilled in avoiding blasts from bombs.

Figure 4A:
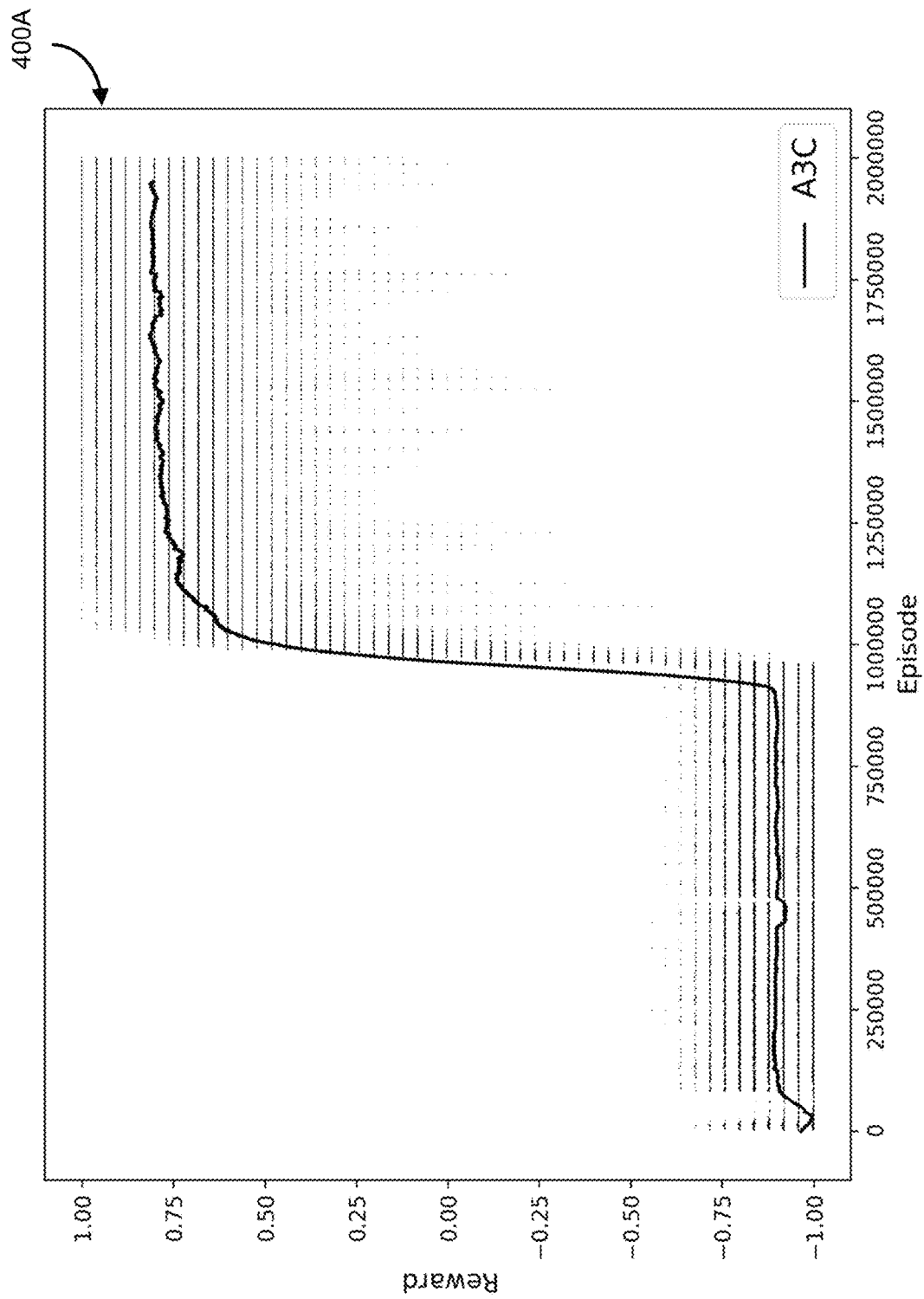
FIGS. 4A-4C are graphs showing a moving average over 50 k games of the rewards (horizontal lines depict individual episodic rewards) obtained by the two proposed architectures (FIG. 4B and FIG. 4C), and A3C (FIG. 4A) against a static opponent, according to some embodiments.
Figure 4B:
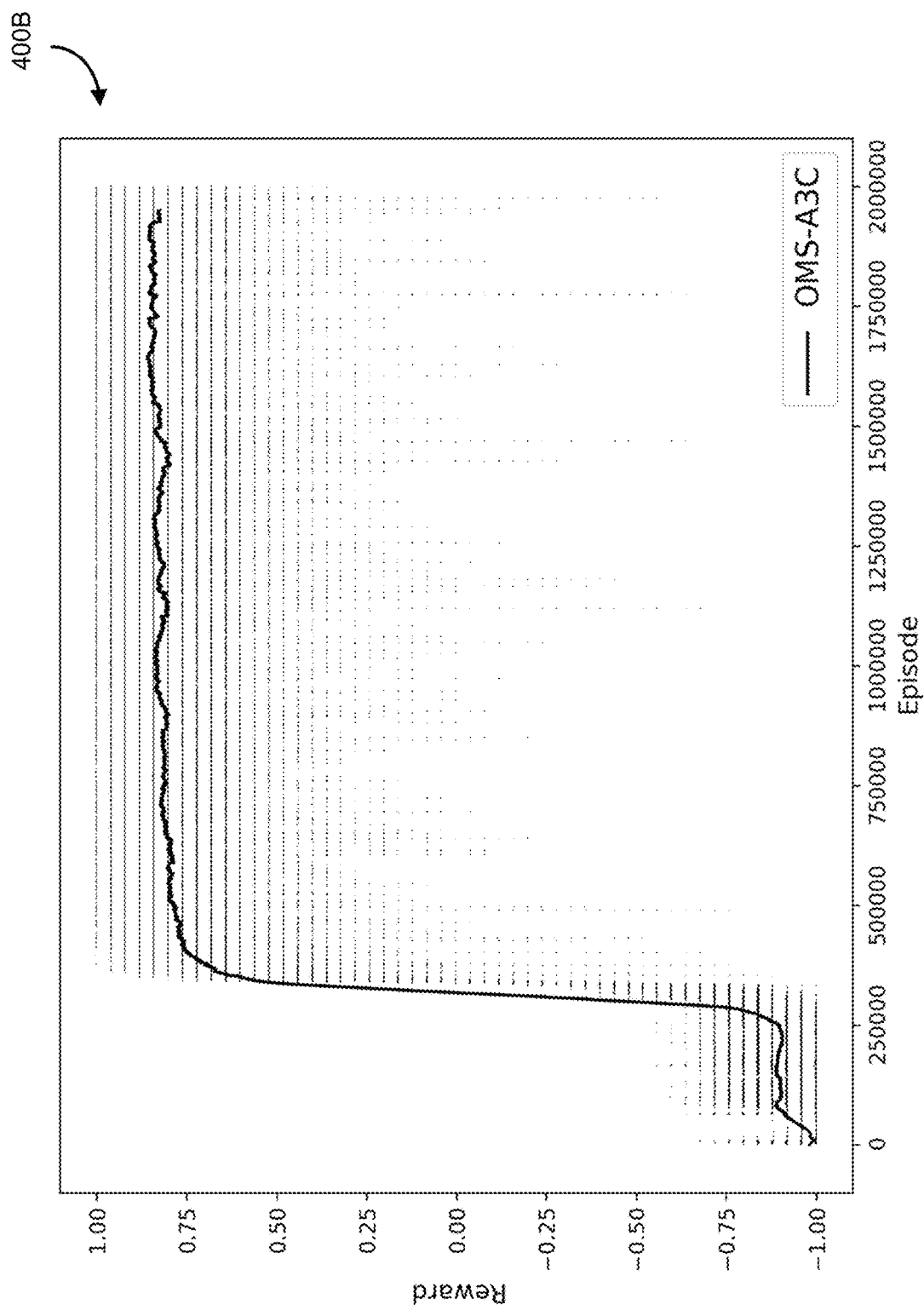
Figure 4C:
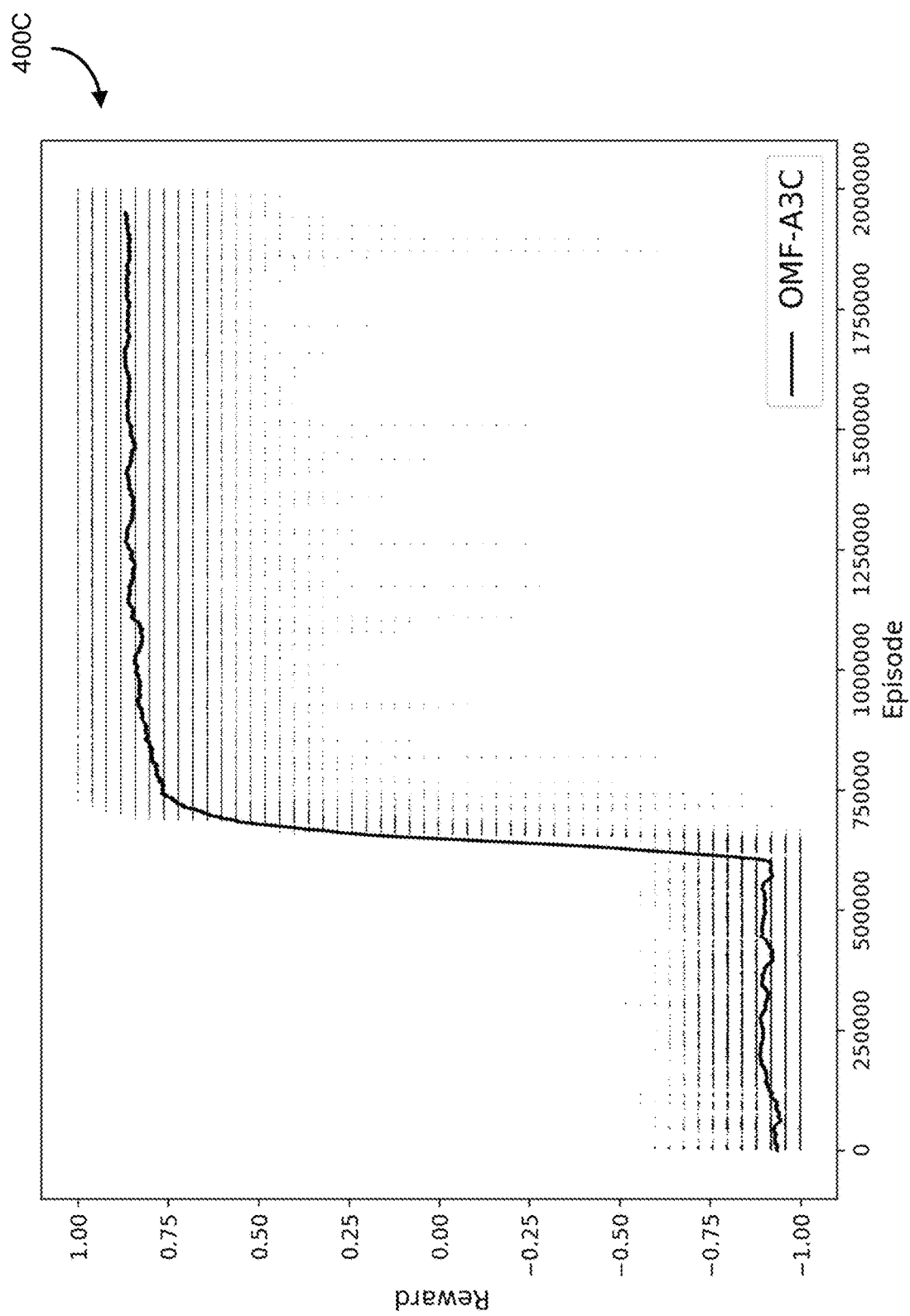

FIGS. 4A-4C are graphs showing a moving average over 50 k games of the rewards (horizontal lines depict individual episodic rewards) obtained by the two proposed architectures (FIG. 4B and FIG. 4C), and A3C (FIG. 4A) against a static agent, according to some embodiments.

Applicants evaluated the two proposed architectures and the standard A3C against the opponents mentioned above. In all cases, Applicants provided learning agents with dense rewards and Applicants did not tune those reward terms. In the example setting the entire board is visible and agents receive one observation per timestep from the environment as a 18×8×8 matrix which contains the description of the board for the current timestep (details in the Appendix). For opponent modeling loss, Applicants set $\lambda_{AM}=1-0.1\times10^5$ and Applicants annealed through the learning phase.

STATIC OPPONENTS: This opponent is extremely simple, in this case, the learning agent needs to move near the opponent, place a bomb that blasts the opponent, and escape safely from the blast. Learning curves in terms of average rewards are depicted in FIG. 4A-4C where it can be seen that the two proposed architectures learned faster than the standard A3C. In this case, AMS-A3C was quicker than AMF-A3C, possibly because the opponent is so simple that just sharing parameters is sufficient, rather than using the more elaborate AMF-A3C architecture.

STOCHASTIC OPPONENTS: Next, Applicants evaluated the example implementation against the random moving agent, in this case, the opponent moves randomly or stays, since there is a delay of 10 timesteps between placing a bomb and the blast, this complicates the scenario for the learning agent. Results against this opponent are depicted in FIG. 5 where it can be seen that the two proposed architectures learned faster than A3C. In this case AMF-A3C obtained better results than AMS-A3C.

Figure 5A:
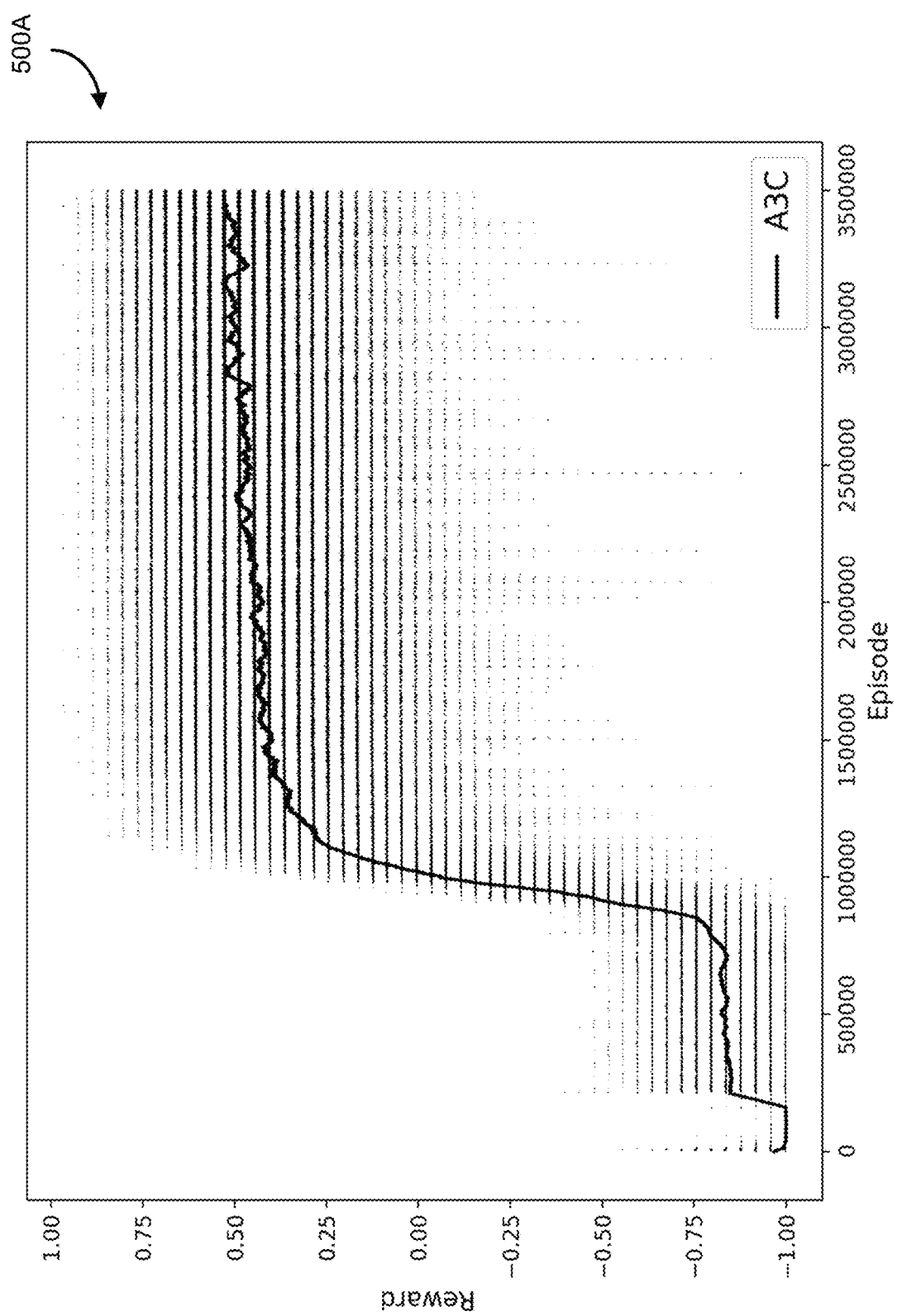
FIGS. 5A-5C is a graph showing a moving average over 50 k games of the rewards (horizontal lines depict individual episodic rewards) obtained by the two proposed architectures (FIGS. 5B, 5C) and A3C (FIG. 5A) against a random moving opponent, according to some embodiments.
Figure 5B:
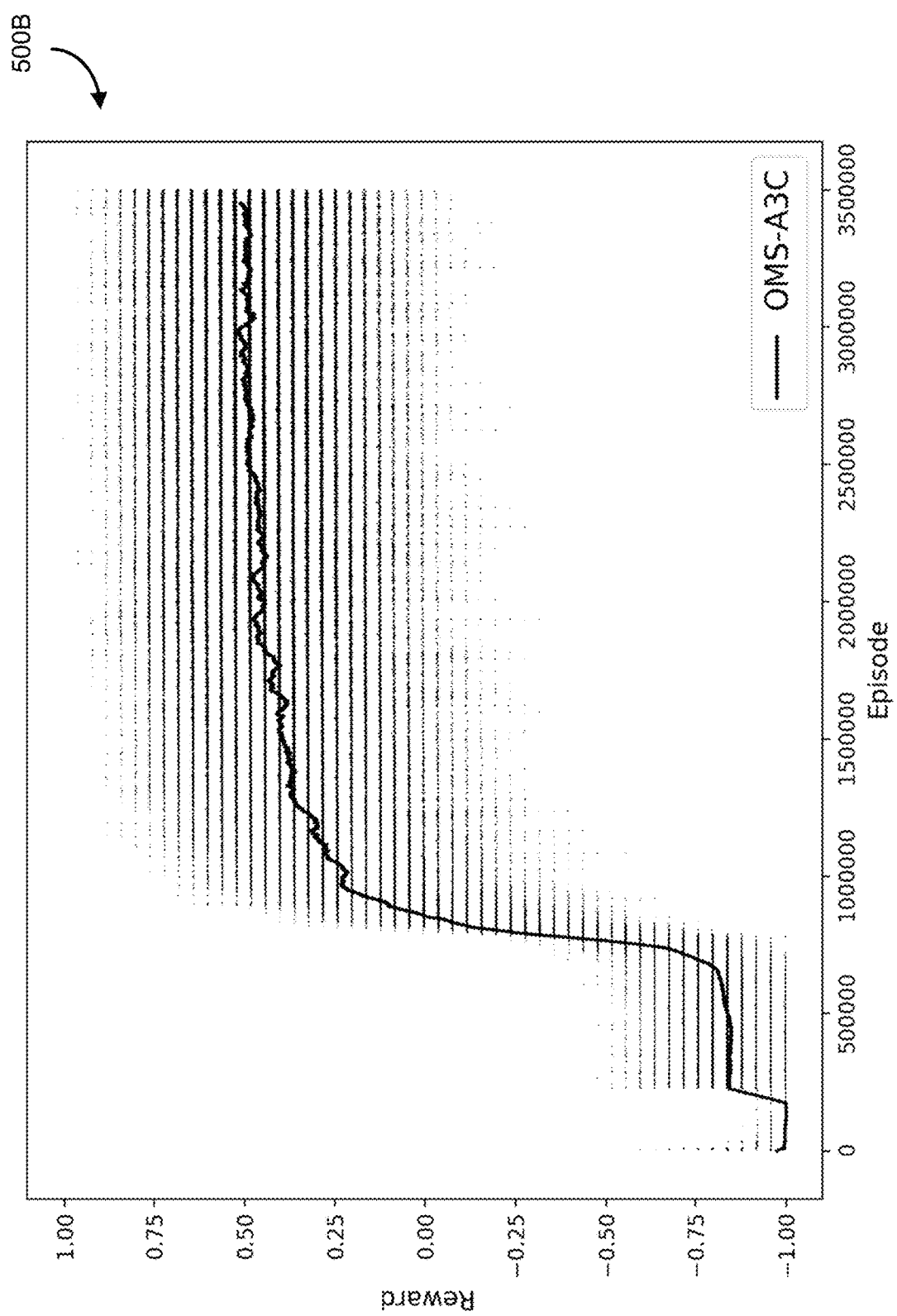
Figure 5C:
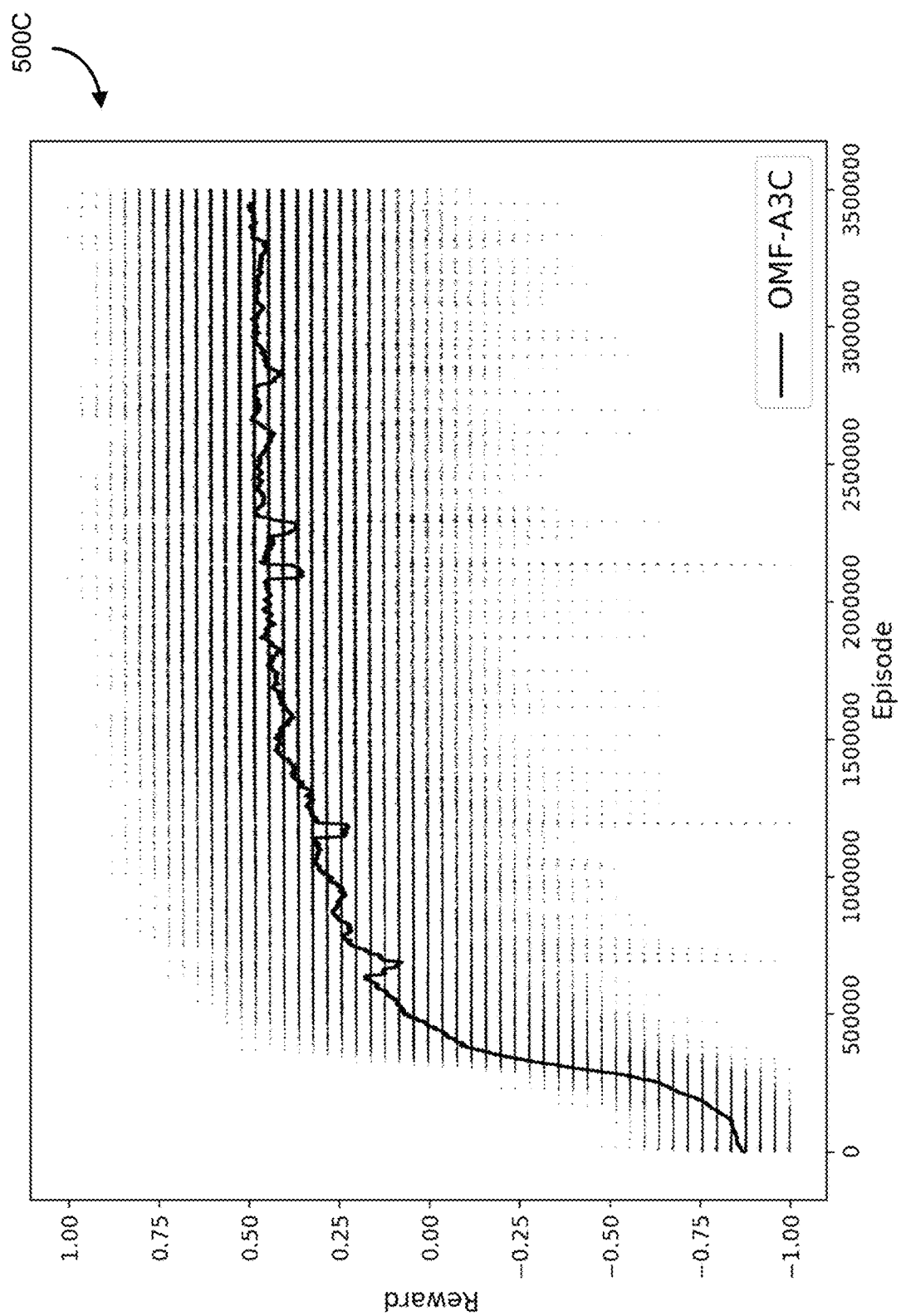

FIGS. 5A-5C is a graph showing a moving average over 50 k games of the rewards (horizontal lines depict individual episodic rewards) obtained by the two proposed architectures (FIGS. 5B, 5C) and A3C (FIG. 5A) against a random moving opponent, according to some embodiments.

The third experiment was an evaluation against the rule-based opponent. In this case, Applicants let the learning agents train for more episodes to guarantee convergence. Results are depicted in FIGS. 6A-6C, where it can be seen that AMS-A3C and AMF-A3C show similar curves, both outperforming A3C in terms of rewards.

Figure 6A:
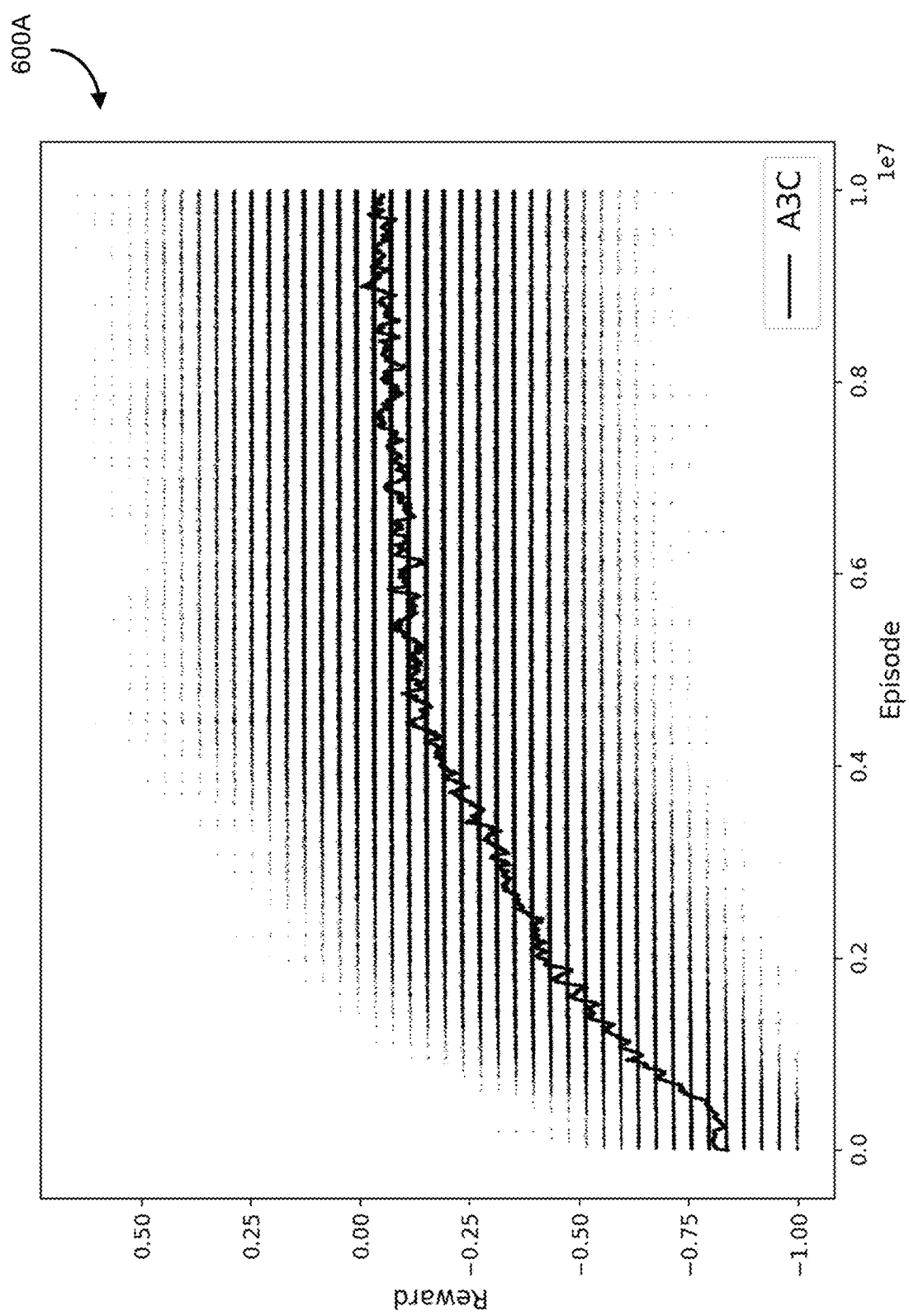
FIGS. 6A-6C are graphs showing a moving average over 50 k games of the rewards (horizontal lines depict individual episodic rewards) obtained by the two proposed architectures (FIGS. 6B, 6C) and A3C (FIG. 6A) against the rule-based opponent. AMS-A3C and AMF-A3C obtained higher scores than A3C, according to some embodiments.
Figure 6B:
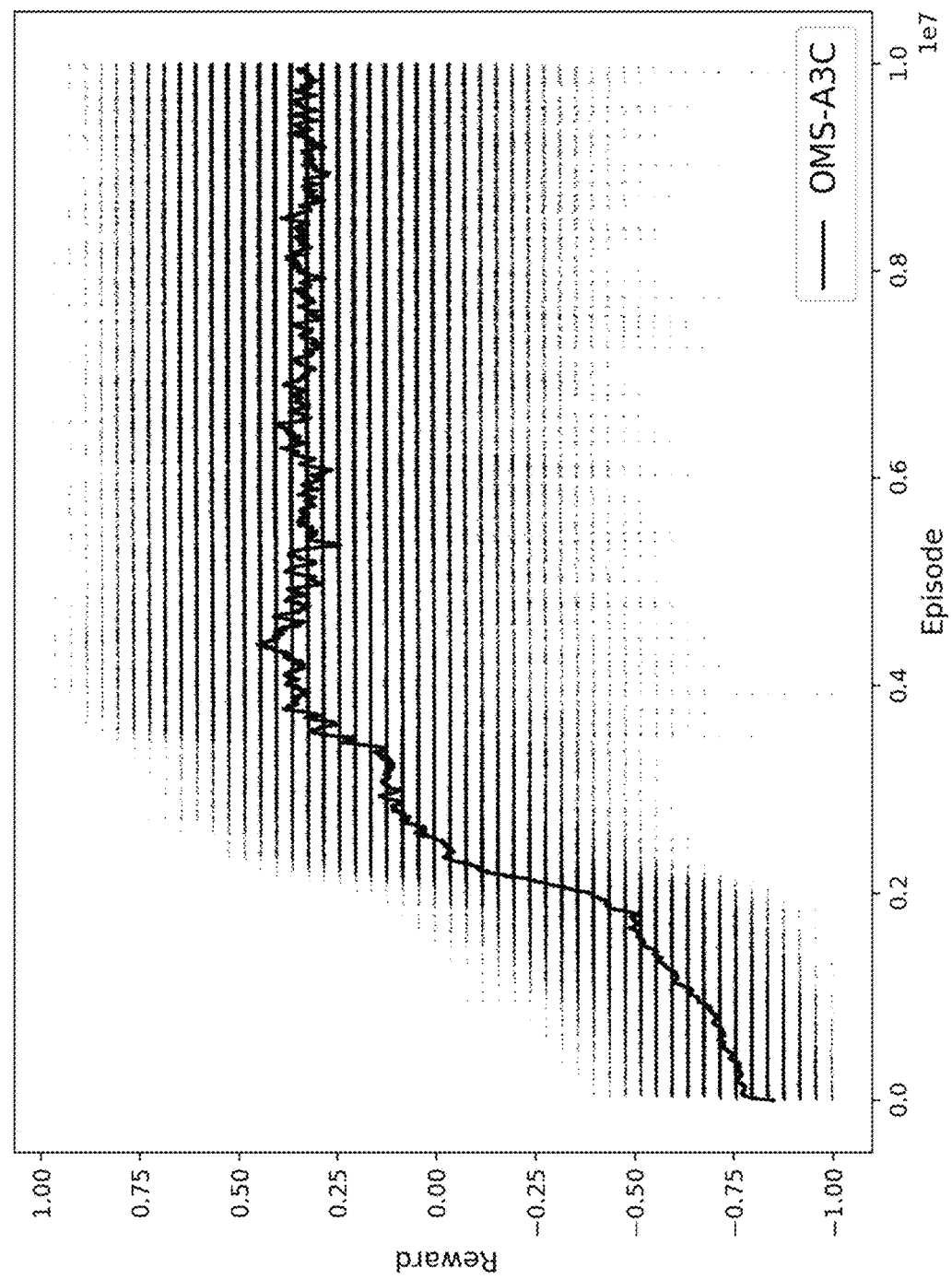
Figure 6C:
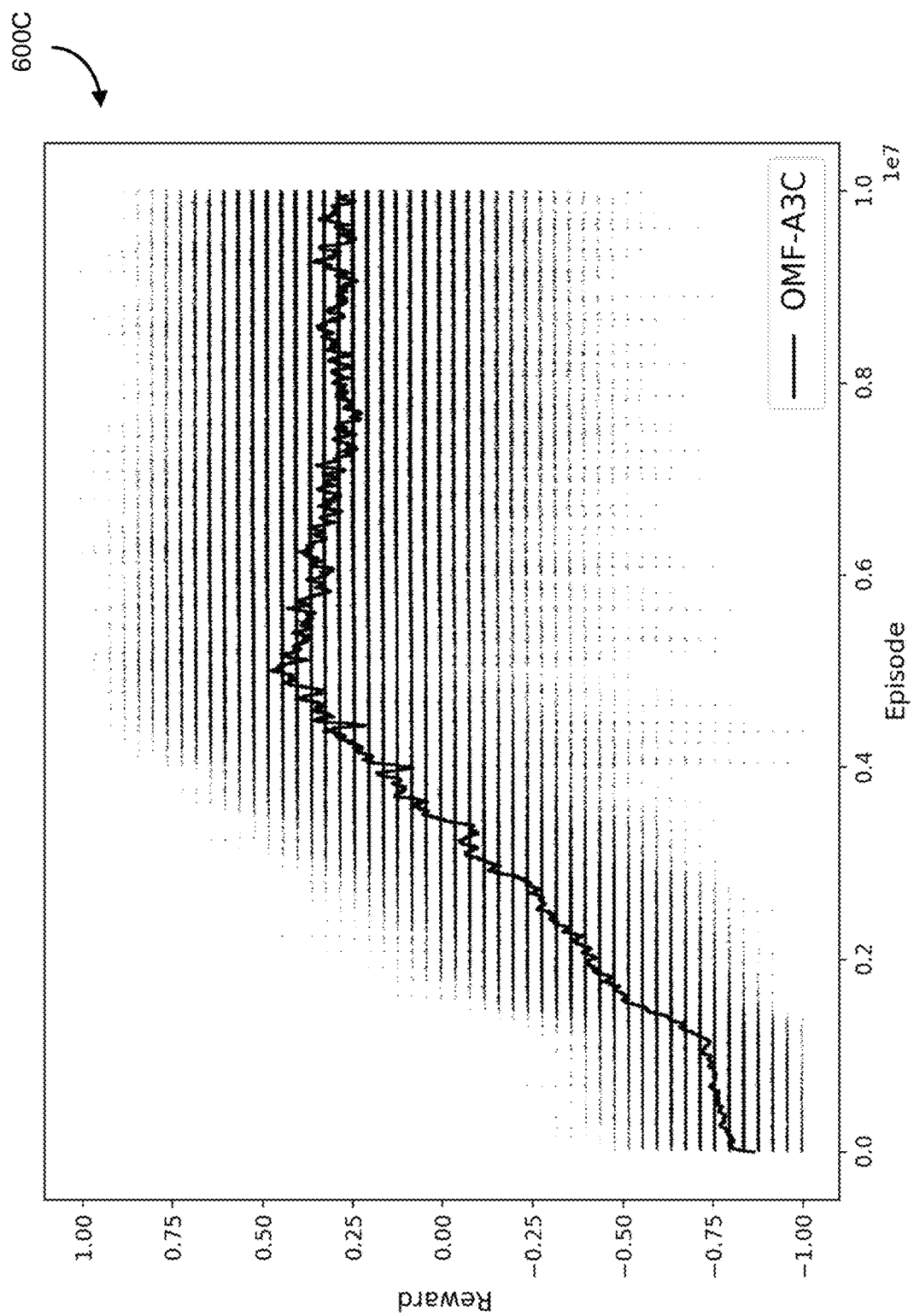

FIGS. 6A-6C are graphs showing a moving average over 50 k games of the rewards (horizontal lines depict individual episodic rewards) obtained by the two proposed architectures (FIGS. 6B, 6C) and A3C (FIG. 6A) against the rule-based opponent. AMS-A3C and AMF-A3C obtained higher scores than A3C, according to some embodiments.

CURRICULUM LEARNING

As a further experiment, Applicants evaluated a simple approach of curriculum learning where instead of only training against the same opponent Applicants trained sequentially against three different opponents (for 2M games each) and lastly against the rule-based opponent for 4M games. In this case, the weight of the loss was set to $\lambda_{OM}=0.5$.

Figure 7A:
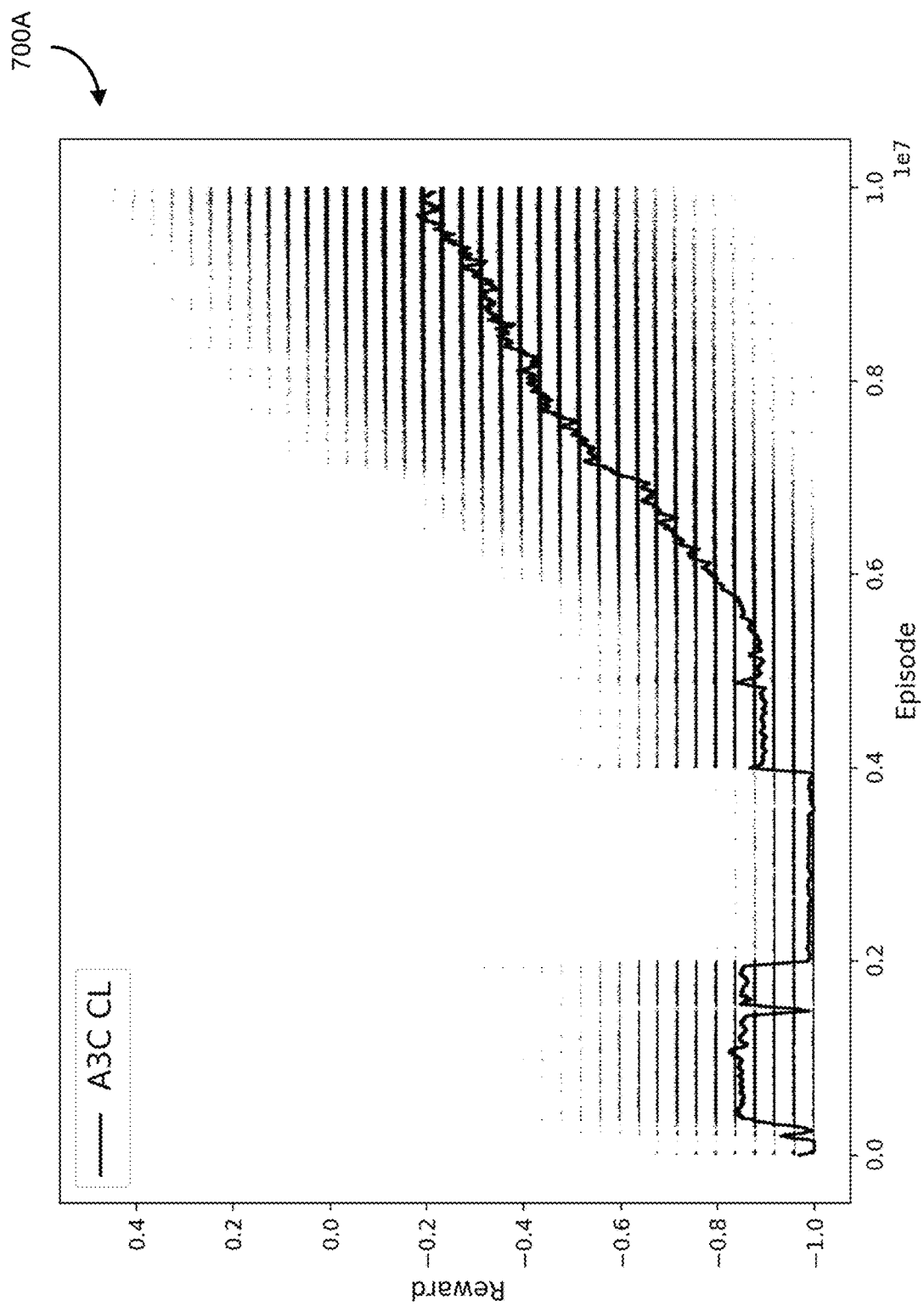
FIG. 7 is a graph showing opponent curriculum learning: three different opponents for the first 6M episodes and then against the rule-based opponent for 4M, according to some embodiments. AMS-A3C and AMF-A3C significantly outperformed over A3C, according to some embodiments.
Figure 7B:
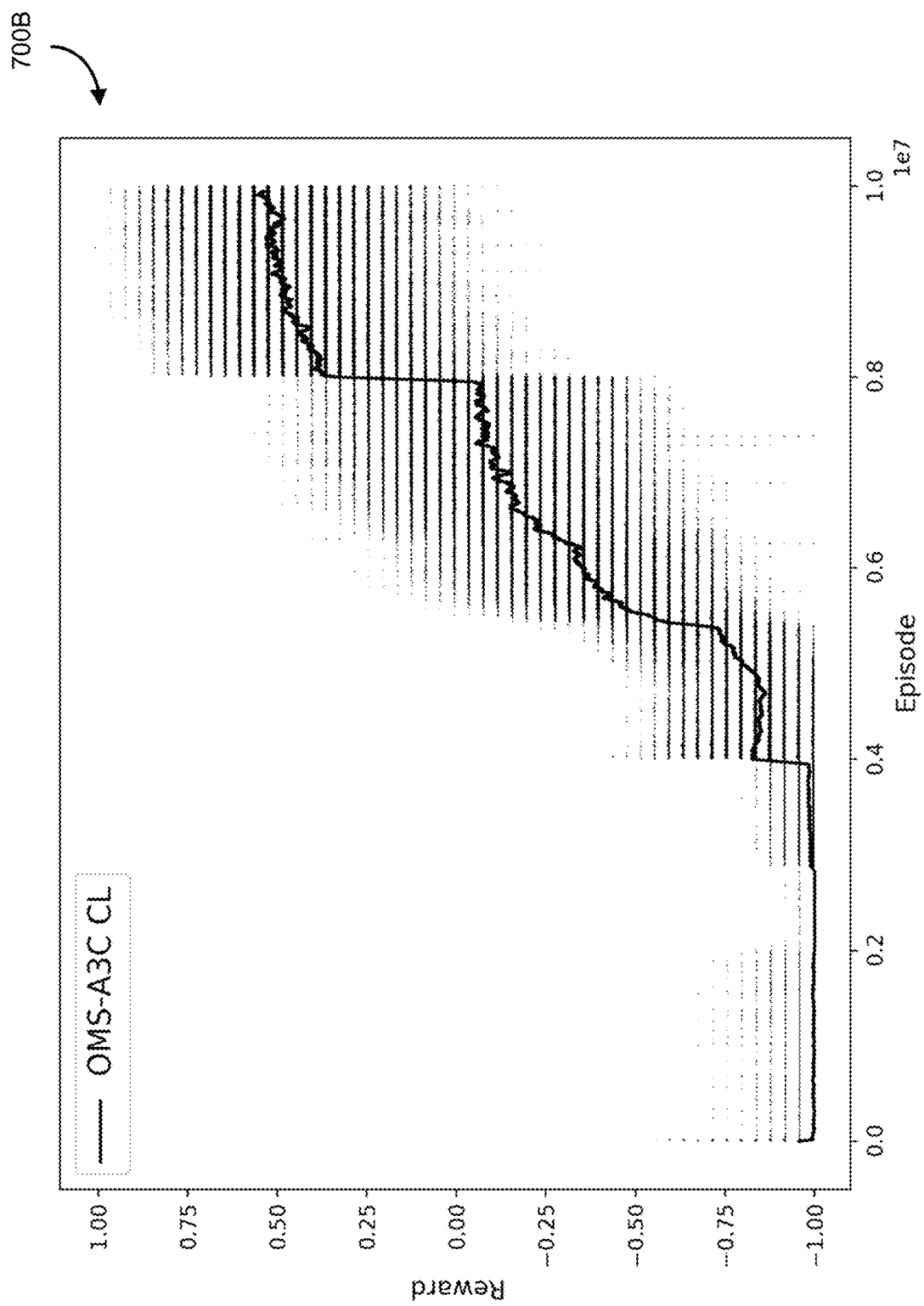
Figure 7C:
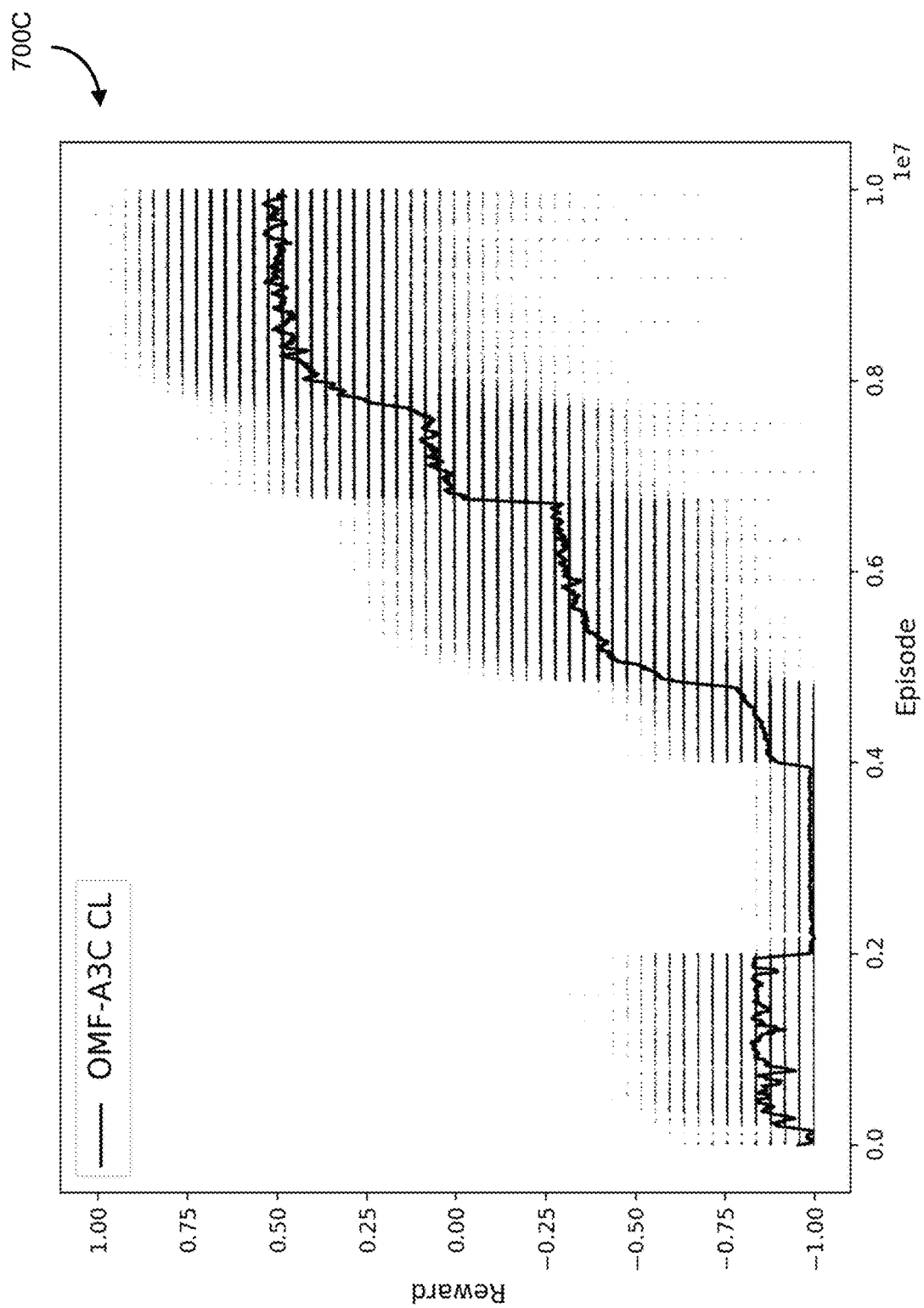

FIG. 7 is a graph showing opponent curriculum learning: three different opponents for the first 6M episodes and then against the rule-based opponent for 4M, according to some embodiments. AMS-A3C and AMF-A3C significantly outperformed over A3C, according to some embodiments. FIG. 7 depicts the results where it can be seen that against the first three opponents the rewards are very low, possibly because of the short number of episodes to train. However, when placed against the rule-based agent it improves quickly, even surpassing the results obtained by training solely against the rule-based opponent. The preliminary results suggest that having more variety in the opponent space can improve the learned features.

In FIG. 7, there are 4 opponents during training time. The first 2M episodes are against the Random moving opponent. From 2-4M, the iterations are against a variation of the rule-based opponent that does not place any bombs instead it only collects power-ups and moves away from blasts and bombs. As the standard rule based agent it uses Dijkstra's algorithm at each time-step for finding shortest paths among different points in the board.

Previous experiments showed that AMS-A3C and AMF-A3C accelerate learning by means of opponent modeling, in two cases learning converged faster and another one learning was better (in term of rewards) than A3C.

Figure 8:
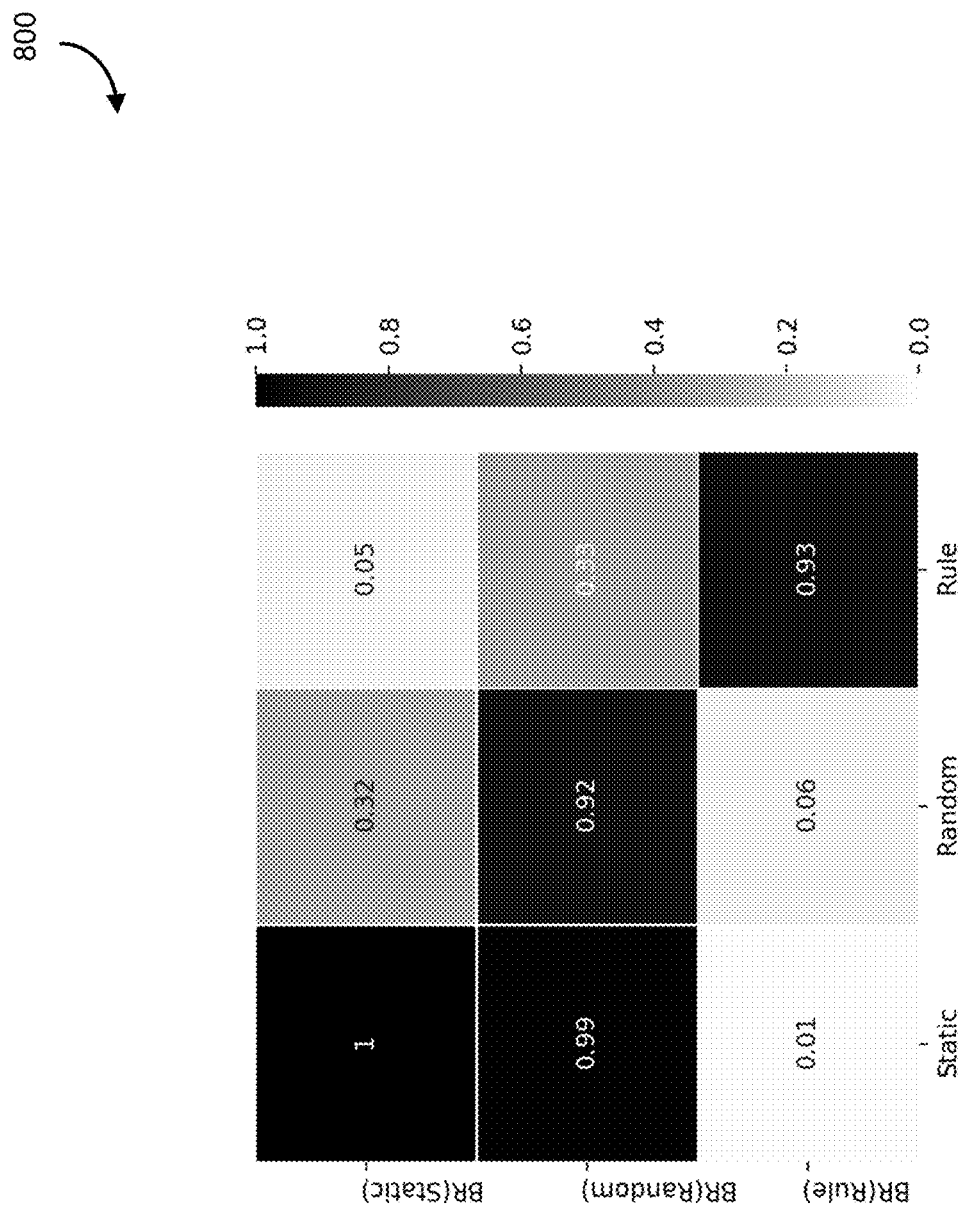
FIG. 8 is a table showing win rates of the trained policies (BR) against different opponents (Static, Random, Rule), 1.0 is all games won, 0 all games lost, according to some embodiments.

Applicants evaluated the resulting policies of AMF-A3C trained against each different opponent, namely, BR(Static), BR(Random), and BR(Rule). When facing the opponent for which they were trained against the winning rates in all cases were higher than 90%. Applicants also tested how those policies fare against the other two opponents, see FIG. 8. FIG. 8 is a table showing win rates of the trained policies (BR) against different opponents (Static, Random, Rule), 1.0 is all games won, 0 all games lost, according to some embodiments. This shows the learning agents can best-respond against the opponent they were trained with but they also overfit to that one.

In these cases, the winning rate dropped significantly. For example, BR(Static) is almost incapable of winning a game against the rule-based opponent; the agent has not learned how to act against an opponent that moves and places bombs. Similarly, BR(Rule) wins 9 out 10 games against the rule-based opponent but when placed against the static one its performance drops almost to zero. In this case the agent has learned to escape from bombs and get the opponent to commit suicide; when the opponent stops placing bombs (static) it behaves poorly.

This generalization over opponent policies is of utmost importance when dealing with dynamic multiagent environments and there are different ways to deal with this problem. Common approaches include: adapt the learning rate [Bowling and Veloso 2002], assume and best respond to a worst-case opponent [Littman 1994], and perform online implicit modeling [Bard et al. 2013], among others. Lanctot et al. (Lanctot:vn) recently studied similar overfitting behaviors in DRL and proposed an opponent regularization by means of approximately best responding to a mixture of policies using empirical game theoretic analysis.

Deep reinforcement learning has shown outstanding results in recent years. However, there are still many open questions regarding different recent learning algorithms. In this context, Applicants take as base a major representative of asynchronous methods, i.e., A3C and propose two architectures which are designed to conduct opponent modelling in particular approaches that improve computational outcomes, this is, they also aim at learning the opponent policy. The architectures AMS-A3C and AMF-A3C are improvements on multiagent DRL concepts: parameter sharing and policy features. Experiments in a simplified version of Pommerman™ obtained better results, in terms of rewards and/or learning time, compared to the standard A3C.

The approach described herein serves as an important stepping stone in this direction by proposing two architectures that improve learning when conducting opponent/teammate modeling in deep RL. Applicants experimented in both cooperative and competitive domains. In the former, the proposed approaches of some embodiments were able to learn coordination faster and more robustly compared to the vanilla A3C. In the latter, our agents were able to predict opponent moves in complex simultaneous move, Pommerman, and successfully obtain a best response that resulted in higher scores in terms of rewards.

Figure 9:
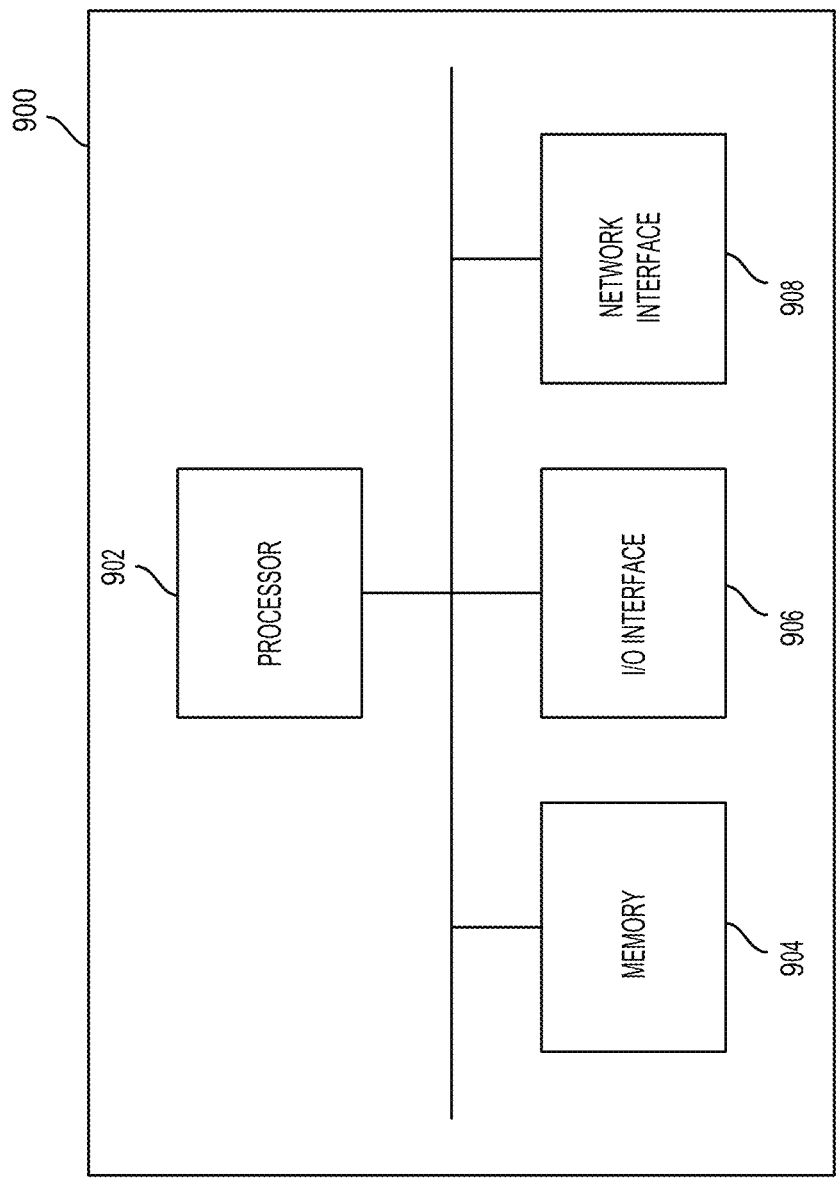
FIG. 9 is a diagram of an example computing system, according to some embodiments.

FIG. 9 is a schematic diagram of a computing device 900 such as a server. As depicted, the computing device includes at least one processor 902, memory 909, at least one I/O interface 906, and at least one network interface 908.

Processor 902 may be an Intel or AMD x86 or x64, PowerPC, ARM processor, or the like. Memory 904 may include a suitable combination of computer memory that is located either internally or externally such as, for example, random-access memory (RAM), read-only memory (ROM), compact disc read-only memory (CDROM).

Each I/O interface 906 enables computing device 900 to interconnect with one or more input devices, such as a keyboard, mouse, camera, touch screen and a microphone, or with one or more output devices such as a display screen and a speaker.

Each network interface 908 enables computing device 900 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. WMAX), SS7 signaling network, fixed line, local area network, wide area network, and others.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

REFERENCES

[Albrecht and Ramamoorthy 2013] Albrecht, S. V., and Ramamoorthy, S. 2013. A game-theoretic model and best-response learning method for ad hoc coordination in multi-agent systems. In Proceedings of the 12th International Conference on Autonomous Agents and Multi-agent Systems, 1155-1156.

[Albrecht and Stone 2018] Albrecht, S. V., and Stone, P. 2018. Autonomous agents modelling other agents: A comprehensive survey and open problems. Artificial Intelligence 258:66-95.

[Arulkumaran et al. 2017] Arulkumaran, K.; Deisenroth, M. P.; Brundage, M.; and Bharath, A. A. 2017. A Brief Survey of Deep Reinforcement Learning. arXiv preprint arXiv:1708.05866v2.

[Banerjee and Peng 2005] Banerjee, B., and Peng, J. 2005. Efficient learning of multistep best response. In Proceedings of the 4th International Conference on Autonomous Agents and Multiagent Systems, 60-66.

[Bansal et al. 2018] Bansal, T.; Pachocki, J.; Sidor, S.; Sutskever, I.; and Mordatch, I. 2018. Emergent Complexity via Multi-Agent Competition. In International Conference on Machine Learning.

[Bard et al. 2013] Bard, N.; Johanson, M.; Burch, N.; and Bowling, M. 2013. Online implicit agent modelling. In Proceedings of the 12th International Conference on Autonomous Agents and Multiagent Systems, 255-262.

[Barrett et al. 2013] Barrett, S.; Stone, P.; Kraus, S.; and Rosenfeld, A. 2013. Teamwork with Limited Knowledge of Teammates. In Proceedings of the Twenty-Seventh AAAI Conference on Artificial Intelligence, 102-108.

[Bellemare et al. 2019] Bellemare, M. G.; Dabney, W.; Dadashi, R.; Taiga, A. A.; Castro, P. S.; Roux, N. L.; Schuurmans, D.; Lattimore, T.; and Lyle, C. 2019. A geometric perspective on optimal representations for reinforcement learning. arXiv preprint arXiv: 1901.11530.

[Bengio, Courville, and Vincent 2013] Bengio, Y.; Courville, A.; and Vincent, P. 2013. Representation learning: A review and new perspectives. IEEE transactions on pattern analysis and machine intelligence 35(8):1798-1828.

[Borovikov et al. 2019] Borovikov, I.; Zhao, Y.; Beirami, A.; Harder, J.; Kolen, J.; Pestrak, J.; Pinto, J.; Pourabolghasem, R.; Chaput, H.; Sardari, M.; et al. 2019. Winning isn't everything: Training agents to playtest modern games. In AAAI Workshop on Reinforcement Learning in Games.

[Bengio et al. 2009] Bengio, Y.; Louradour, J.; Collobert, R.; and Weston, J. 2009. Curriculum learning. In Proceedings of the 26th annual international conference on machine learning, 41-48. ACM.

[Bowling and Veloso 2002] Bowling, M., and Veloso, M. 2002. Multiagent learning using a variable learning rate. Artificial Intelligence 136(2):215-250.

[Brown 1951] Brown, G. W. 1951. Iterative solution of games by fictitious play. Activity analysis of production and allocation 13(1):374-376.

[Busoniu, Babuska, and De Schutter2008] Busoniu, L.; Babuska, R.; and De Schutter, B. 2008. A Comprehensive Survey of Multiagent Reinforcement Learning. IEEE Transactions on Systems, Man and Cybernetics, Part C (Applications and Reviews) 38(2):156-172.

[Camerer, Ho, and Chong 2004] Camerer, C. F.; Ho, T.-H.; and Chong, J.-K. 2004. Behavioural Game Theory: Thinking, Learning and Teaching. In Advances in Understanding Strategic Behavior. 120-180.

[Carmel and Markovitch 1995] Carmel, D., and Markovitch, S. 1995. Opponent Modeling in Multi-Agent Systems. In IJCAI '95: Proceedings of the Workshop on Adaption and Learning in Multi-Agent Systems. Springer-Verlag.

[Caruana 1997] Caruana, R. 1997. Multitask learning. Machine learning 28(1):41-75.

[Chalkiadakis and Boutilier 2003] Chalkiadakis, G., and Boutilier, C. 2003. Coordination in Multiagent Reinforcement Learning: A Bayesian Approach. In Proceedings of the International Conference on Autonomous Agents, 709-716.

[Clevert, Unterthiner, and Hochreiter 2015] Clevert, D.-A.; Unterthiner, T.; and Hochreiter, S. 2015. Fast and accurate deep network learning by exponential linear units (ELUs). arXiv preprint arXiv:1511.07289.

[Foerster et al. 2016] Foerster, J. N.; Assael, Y. M.; De Freitas, N.; and Whiteson, S. 2016. Learning to communicate with deep multi-agent reinforcement learning. In Advances in Neural Information Processing Systems, 2145-2153.

[Foerster et al. 2017] Foerster, J. N.; Nardelli, N.; Farquhar, G.; Afouras, T.; Torr, P. H. S.; Kohli, P.; and Whiteson, S. 2017. Stabilising Experience Replay for Deep Multi-Agent Reinforcement Learning. In International Conference on Machine Learning.

[Foerster et al. 2018] Foerster, J. N.; Chen, R. Y.; Al-Shedivat, M.; Whiteson, S.; Abbeel, P.; and Mordatch, I. 2018. Learning with Opponent-Learning Awareness. In Proceedings of 17th International Conference on Autonomous Agents and Multiagent Systems.

[Gruslys et al. 2017] Gruslys, A.; Azar, M. G.; Bellemare, M. G.; and Munos, R. 2017. The reactor: A sample-efficient actor-critic architecture. arXiv preprint arXiv:1704.04651.

[He et al. 2016] He, H.; Boyd-Graber, J.; Kwok, K.; and Daume, H. 2016. Opponent modeling in deep reinforcement learning. In 33rd International Conference on Machine Learning, 2675-2684.

[Heinrich and Silver2016] Heinrich, J., and Silver, D. 2016. Deep Reinforcement Learning from Self-Play in Imperfect-Information Games. arXiv preprint arXiv: 1603.01121.

[Henderson et al. 2018] Henderson, P.; Islam, R.; Bachman, P.; Pineau, J.; Precup, D.; and Meger, D. 2018. Deep Reinforcement Learning That Matters. In 32nd AAAI Conference on Artificial Intelligence.

[Hernandez-Leal, Kartal, and Taylor 2018] Hernandez-Leal, P.; Kartal, B.; and Taylor, M. E. 2018. Is multiagent deep reinforcement learning the answer or the question? A brief survey. arXiv preprint arXiv:1810.05587.

[Hong et al. 2018] Hong, Z.-W.; Su, S.-Y.; Shann, T.-Y.; Chang, Y.-H.; and Lee, C.-Y. 2018. A Deep Policy Inference Q-Network for Multi-Agent Systems. In International Conference on Autonomous Agents and Multiagent Systems.

[Jaderberg et al. 2017a] Jaderberg, M.; Dalibard, V.; Osindero, S.; Czarnecki, W. M.; Donahue, J.; Razavi, A.; Vinyals, 0.; Green, T.; Dunning, I.; Simonyan, K.; et al. 2017a. Population based training of neural networks. arXiv preprint arXiv:1711.09846.

[Jaderberg et al. 2017b] Jaderberg, M.; Mnih, V.; Czarnecki, W. M.; Schaul, T.; Leibo, J. Z.; Silver, D.; and Kavukcuoglu, K. 2017b. Reinforcement Learning with Unsupervised Auxiliary Tasks. In *International Conference on Learning Representations*.

[Jaderberg et al. 2018] Jaderberg, M.; Czarnecki,W. M.; Dunning, I.; Marris, L.; Lever, G.; Casta'neda, A. G.; Beattie, C.; Rabinowitz, N. C.; Morcos, A. S.; Ruderman, A.; Sonnerat, N.; Green, T.; Deason, L.; Leibo, J. Z.; Silver, D.; Hassabis, D.; Kavukcuoglu, K.; and Graepel, T. 2018. Human-level performance in first person multiplayer games with population-based deep reinforcement learning. arXiv preprint arXiv:1807.01281.

[Lample and Chaplot 2017] Lample, G., and Chaplot, D. S. 2017. Playing fps games with deep reinforcement learning. In *AAAI*, 2140-2146.

[Lanctot et al. 2017] Lanctot, M.; Zambaldi, V. F.; Gruslys, A.; Lazaridou, A.; Tuyls, K.; P'erolat, J.; Silver, D.; and Graepel, T. 2017. A Unified Game-Theoretic Approach to Multiagent Reinforcement Learning. In *Advances in Neural Information Processing Systems*.

[Littman 1994] Littman, M. L. 1994. Markov games as a framework for multi-agent reinforcement learning. In Proceedings of the 11*th International Conference on Machine Learning*, 157-163.

[Maaten and Hinton 2008] Maaten, L. v. d., and Hinton, G. 2008. Visualizing data using t-SNE. Journal of Machine Learning Research 9(November).

[Mirowski et al. 2017] Mirowski, P.; Pascanu, R.; Viola, F.; Soyer, H.; Ballard, A. J.; Banino, A.; Denil, M.; Goroshin, R.; Sifre, L.; Kavukcuoglu, K.; et al. 2017. Learning to navigate in complex environments. ICLR.

[Mnih et al. 2013] Mnih, V.; Kavukcuoglu, K.; Silver, D.; Graves, A.; Antonoglou, I.; Werstra, D.; and Riedmiller, M. 2013. Playing Atari with Deep Reinforcement Learning. arXiv preprint arXiv:1312.5602v1.

[Mnih et al. 2015] Mnih, V.; Kavukcuoglu, K.; Silver, D.; Rusu, A. A.; Veness, J.; Bellemare, M. G.; Graves, A.; Riedmiller, M.; Fidjeland, A. K.; Ostrovski, G.; Petersen, S.; Beattie, C.; Sadik, A.; Antonoglou, I.; King, H.; Kumaran, D.; Werstra, D.; Legg, S.; and Hassabis, D. 2015. Human-level control through deep reinforcement learning. Nature 518(7540):529-533.

[Mnih et al. 2016] Mnih, V.; Badia, A. P.; Mirza, M.; Graves, A.; Lillicrap, T.; Harley, T.; Silver, D.; and Kavukcuoglu, K. 2016. Asynchronous methods for deep reinforcement learning. In *International conference on machine learning*, 1928-1937.

[Morav˘c'ik et al. 2017] Morav˘'ik, M.; Schmid, M.; Burch, N.; Lis'y, V.; Morrill, D.; Bard, N.; Davis, T.; Waugh, K.; Johanson, M.; and Bowling, M. 2017. Deep-Stack: Expert-level artificial intelligence in heads-up no-limit poker. Science 356(6337):508-513.

[Nagarajan, Warnell, and Stone 2018] Nagarajan, P.; Warnell, G.; and Stone, P. 2018. Deterministic implementations for reproducibility in deep reinforcement learning. arXiv preprint arXiv:1809.05676.

[Palmer et al. 2018] Palmer, G.; Tuyls, K.; Bloembergen, D.; and Savani, R. 2018. Lenient Multi-Agent Deep Reinforcement Learning. In AAMAS.

[Rabinowitz et al. 2018] Rabinowitz, N. C.; Perbet, F.; Song, H. F.; Zhang, C.; Eslami, S. M. A.; and Botvinick, M. 2018. Machine Theory of Mind. In *International Conference on Machine Learning*.

[Raileanu et al. 2018] Raileanu, R.; Denton, E.; Szlam, A.; and Fergus, R. 2018. Modeling Others using Oneself in Multi-Agent Reinforcement Learning. In *International Conference on Machine Learning*.

[Resnick et al. 2018] Resnick, C.; Eldridge,W.; Ha, D.; Britz, D.; Foerster, J.; Togelius, J.; Cho, K.; and Bruna, J. 2018. Pommerman: A multi-agent playground. arXiv preprint arXiv:1809.07124.

[Schulman et al. 2017] Schulman, J.; Wolski, F.; Dhariwal, P.; Radford, A.; and Klimov, O.2017. Proximal Policy Optimization Algorithms. arXiv preprint arXiv:1707.06347.

[Silver et al. 2016] Silver, D.; Huang, A.; Maddison, C. J.; et al. 2016. Mastering the game of Go with deep neural networks and tree search. Nature 529(7587):484-489.

[Sutton and Barto 1998] Sutton, R. S., and Barto, A. G. 1998. *Introduction to reinforcement learning*, volume 135. MIT press Cambridge.

[Schadd, Bakkes, and Spronck 2007] Schadd, F.; Bakkes, S.; and Spronck, P. 2007. Opponent modeling in real-time strategy games. In GAMEON, 61-70.

[Shelhamer et al. 2017] Shelhamer, E.; Mahmoudieh, P.; Argus, M.; and Darrell, T. 2017. Loss is its own reward: Self-supervision for reinforcement learning. ICLR workshops.

[Suddarth and Kergosien 1990] Suddarth, S. C., and Kergosien, Y. 1990. Rule-injection hints as a means of improving network performance and learning time. In Neural Networks. Springer. 120-129.

[Tampuu et al. 2015] Tampuu, A.; Matiisen, T.; Kodelja, D.; Kuzovkin, I.; Korjus, K.; Aru, J.; Aru, J.; and Vicente, R. 2015. Multiagent Cooperation and Competition with Deep Reinforcement Learning. International Conference on Learning Representations.

[Torrado et al. 2018] Torrado, R. R.; Bontrager, P.; Togelius, J.; Liu, J.; and Perez-Liebana, D. 2018. Deep Reinforcement Learning for General Video Game AI. arXiv preprint arXiv:1806.02448.

[Tuyls and Weiss 2012] Tuyls, K., and Weiss, G. 2012. Multiagent learning: Basics, challenges, and prospects. *AI Magazine* 33(3):41-52.

[Walsh et al. 2002] Walsh, W. E.; Das, R.; Tesauro, G.; and Kephart, J. 0. 2002. Analyzing complex strategic interactions in multi-agent systems. AAAI-02 *Workshop on Game-Theoretic and Decision-Theoretic Agents* 109-118.

[Watkins 1989] Watkins, J. 1989. *Learning from delayed rewards*. Ph.D. Dissertation, King's College, Cambridge, UK.

[Zahavy, Ben-Zrihem, and Mannor 2016] Zahavy, T.; Ben-Zrihem, N.; and Mannor, S. 2016. Graying the black box: Understanding DQNs. In ICML.

[Zhao and Szafron 2009] Zhao, R., and Szafron, D. 2009. Learning character behaviors using agent modeling in games. In AZIDE.

[Zheng et al. 2018] Zheng, Y.; Meng, Z.; Hao, J.; Zhang, Z.; Yang, T.; and Fan, C. 2018. A deep bayesian policy reuse approach against non-stationary agents. In NeurIPS. 962-972.

APPENDIX

State Representation: 18 feature maps were maintained that are constructed from the agent observation. These channels maintain location of walls, woods, power-ups, agents, bombs and flames.

Table 1 shows the dense rewards values used in all the experiments. Preliminary experiments suggested better results using this values than without any dense rewards, however, these were not tuned.

TABLE 1

| Dense rewards values | |
|---|---|
| R_POWER_KICK | 0.03 |
| R_POWER_BLAST | 0.02 |
| R_POWER_BOMB | 0.01 |
| R_KICK_BOMB | 0.001 |
| R_BLAST_WOOD | 0.001 |
| R_PLACED_BOMB | 0.0001 |
| R_BEING_ALIVE | 0.00000001 |

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A computer system for extending parallelized asynchronous reinforcement learning to include agent modeling for training a neural network, the system comprising:
    a data storage configured to store one or more data structures representing interconnected computing units of the neural network, including data fields storing weighted interconnections between the interconnected computing units;
    a plurality of hardware processors or threads of hardware processors;
    a parallel processing controller configured for coordinated operation of the plurality of hardware processors or threads of hardware processors such that each functions as a worker process that is configured to simultaneously interact with a target computing environment for local gradient computation based on a loss determination function and to update global network parameters based at least on the local gradient computation to train the neural network through modifications of the weighted interconnections between the interconnected computing units as gradient computation is conducted across a plurality of iterations of the target computing environment;
    wherein the loss determination function includes at least a policy loss term (actor), a value loss term (critic), and a supervised cross entropy loss.

2. The system of claim 1, wherein the supervised cross entropy loss is determined between an observed one-hot encoded agent action and a prediction for a trajectory of length N.

3. The system of claim 1, wherein the neural network is configured to perform centralized learning where a plurality of agents share parameters but outputs of the neural network represent different agent actions, and wherein the neural network includes a plurality of convolutional layers, and a plurality of fully connected layers.

4. The system of claim 3, wherein the neural network is configured to utilize a loss function in accordance with the relation:

$$\mathcal{L}_{AMS-A3C} = \mathcal{L}_{A3C} + \frac{1}{N}\sum_{i}^{N} \lambda_{AM_i} \mathcal{L}_{AM_i}$$

where $\lambda_{AM_i}$ is a weight term and $\mathcal{L}_{AM_i}$ is an auxiliary loss for an external agent i:

$$\mathcal{L}_{AM_i} = -\frac{1}{M}\sum_{j}^{M} a_i^j \log(\hat{a}_i^j)$$

which is the supervised cross entropy loss between the observed one-hot encoded agent action (ground truth), $a_i^j$, and a prediction, $\hat{a}_i^j$, for a trajectory of length M; and
wherein N is a number of agents in the plurality of agents.

5. The system of claim 4, wherein the plurality of convolutional layers are connected in series to one another, and the plurality of fully connected layers are connected in series to one another, and the plurality of convolutional layers are also connected in series to the plurality of fully connected layers, wherein a final fully connected layer of the plurality of fully connected layer is used to predict a value of a learning agent, a policy of the learning agent, and one or more opponent/teammate policies, each corresponding to a corresponding external agent of the plurality of agents.

6. The system of claim 4, wherein the neural network is configured to utilize a loss function in accordance with the relation:

$$\mathcal{L}_{AMF-A3C} = \mathcal{L}_{A3C} + \frac{1}{N}\sum_{i}^{N} \lambda_{AM_i} \mathcal{L}_{AM_i}$$

wherein the plurality of convolutional layers are connected in series to one another, and the plurality of fully connected layers include at least two policy heads, and the plurality of convolutional layers are also connected to at least one of the plurality of fully connected layers, wherein the plurality of fully connected layers includes at least an opponent/teammate policy head that provides outputs corresponding to opponent/teammate policy, and a second head used to predict a value of a learning agent and a policy of the learning agent.

7. The system of claim 6, wherein at least one fully connected layer of the plurality of fully connected layers is configured to learn opponent/teammate policy features in a latent space, $h_{opp}$.

8. The system of claim 7, wherein the $h_{opp}$ is used to compute predict the value of the learning agent and the policy of the learning agent.

9. The system of claim 7, wherein the $h_{opp}$ is used applied on an element-wise vector multiplication at the at least one fully connected layer that used to predict the value of the learning agent and the policy of the learning agent.

10. The system of claim 3, wherein the plurality of agents include at least one opponent agent or at least one teammate agent.

11. A computer implemented method for extending parallelized asynchronous reinforcement learning to include agent modeling for training a neural network, the method comprising:
   maintaining one or more data structures representing interconnected computing units of the neural network, including data fields storing weighted interconnections between the interconnected computing units;
   coordinating operation of a plurality of hardware processors or threads of hardware processors such that each functions as a worker process that is configured to simultaneously interact with a target computing environment for local gradient computation based on a loss determination function and to update global network parameters based at least on the local gradient computation to train the neural network through modifications of the weighted interconnections between the interconnected computing units as gradient computation is conducted across a plurality of iterations of the target computing environment;
   wherein the loss determination function includes at least a policy loss term (actor), a value loss term (critic), and a supervised cross entropy loss.

12. The method of claim 11, wherein the supervised cross entropy loss is determined between an observed one-hot encoded agent action and a prediction for a trajectory of length N.

13. The method of claim 11, wherein the neural network is configured to perform centralized learning where a plurality of agents share parameters but outputs of the neural network represent different agent actions, and wherein the neural network includes a plurality of convolutional layers, and a plurality of fully connected layers.

14. The method of claim 13, wherein the neural network is configured to utilize a loss function in accordance with the relation:

$$\mathcal{L}_{AMS-A3C} = \mathcal{L}_{A3C} + \frac{1}{N}\sum_{i}^{N}\lambda_{AM_i}\mathcal{L}_{AM_i}$$

where $\lambda_{AM_i}$ is a weight term and $\mathcal{L}_{AM_i}$ is an auxiliary loss for an external agent i:

$$\mathcal{L}_{AM_i} = -\frac{1}{M}\sum_{j}^{M} a_i^j \log(\hat{a}_i^j)$$

which is the supervised cross entropy loss between the observed one-hot encoded agent action (ground truth), $a_i^j$, and a prediction, $\hat{a}_i^j$ for a trajectory of length M; and wherein N is a number of agents in the plurality of agents.

15. The method of claim 14, wherein the plurality of convolutional layers are connected in series to one another, and the plurality of fully connected layers are connected in series to one another, and the plurality of convolutional layers are also connected in series to the plurality of fully connected layers, wherein a final fully connected layer of the plurality of fully connected layer is used to predict a value of a learning agent, a policy of the learning agent, and one or more opponent/teammate policies, each corresponding to a corresponding external agent of the plurality of agents.

16. The method of claim 14, wherein the neural network is configured to utilize a loss function in accordance with the relation:

$$\mathcal{L}_{AMF-A3C} = \mathcal{L}_{A3C} + \frac{1}{N}\sum_{i}^{N}\lambda_{AM_i}\mathcal{L}_{AM_i}$$

wherein the plurality of convolutional layers are connected in series to one another, and the plurality of fully connected layers include at least two policy heads, and the plurality of convolutional layers are also connected to at least one of the plurality of fully connected layers, wherein the plurality of fully connected layers includes at least an opponent/teammate policy head that provides outputs corresponding to opponent/teammate policy, and a second head used to predict a value of a learning agent and a policy of the learning agent.

17. The method of claim 16, wherein at least one fully connected layer of the plurality of fully connected layers is configured to learn opponent/teammate policy features in a latent space, $h_{opp}$.

18. The method of claim 17, wherein the $h_{opp}$ is used to compute predict the value of the learning agent and the policy of the learning agent.

19. The method of claim 17, wherein the $h_{opp}$ is used applied on an element-wise vector multiplication at the at least one fully connected layer that used to predict the value of the learning agent and the policy of the learning agent.

20. The method of claim 13, wherein the plurality of agents include at least one opponent agent or at least one teammate agent.

21. A non-transitory computer readable medium storing machine interpretable instructions, which when executed on a processor, cause the processor to perform a method for extending parallelized asynchronous reinforcement learning to include agent modeling for training a neural network, the method comprising:
   maintaining one or more data structures representing interconnected computing units of the neural network, including data fields storing weighted interconnections between the interconnected computing units;
   coordinating operation of a plurality of hardware processors or threads of hardware processors such that each functions as a worker process that is configured to simultaneously interact with a target computing environment for local gradient computation based on a loss determination function and to update global network parameters based at least on the local gradient computation to train the neural network through modifications of the weighted interconnections between the interconnected computing units as gradient computation is conducted across a plurality of iterations of the target computing environment;
   wherein the loss determination function includes at least a policy loss term (actor), a value loss term (critic), and a supervised cross entropy loss.

22. A non-transitory computer readable medium storing machine interpretable instructions, which represent a trained neural network, trained based at least on a method for extending parallelized asynchronous reinforcement learning to include agent modeling for training a neural network, the method comprising:

maintaining one or more data structures representing interconnected computing units of the neural network, including data fields storing weighted interconnections between the interconnected computing units;

coordinating operation of a plurality of hardware processors or threads of hardware processors such that each functions as a worker process that is configured to simultaneously interact with a target computing environment for local gradient computation based on a loss determination function and to update global network parameters based at least on the local gradient computation to train the neural network through modifications of the weighted interconnections between the interconnected computing units as gradient computation is conducted across a plurality of iterations of the target computing environment;

wherein the loss determination function includes at least a policy loss term (actor), a value loss term (critic), and a supervised cross entropy loss.

\* \* \* \* \*